United States Patent
Crook et al.

(10) Patent No.: US 8,489,474 B2
(45) Date of Patent: Jul. 16, 2013

(54) SYSTEMS AND/OR METHODS FOR MANAGING TRANSFORMATIONS IN ENTERPRISE APPLICATION INTEGRATION AND/OR BUSINESS PROCESSING MANAGEMENT ENVIRONMENTS

(75) Inventors: Brian E. Crook, Encinitas, CA (US); Gary K. Ng, Carlsbad, CA (US)

(73) Assignee: Software AG, Darmstadt (DE)

(*) Notice: Subject to any disclaimer, the term of this patent is extended or adjusted under 35 U.S.C. 154(b) by 225 days.

(21) Appl. No.: 12/003,783

(22) Filed: Dec. 31, 2007

(65) Prior Publication Data

US 2009/0171720 A1    Jul. 2, 2009

(51) Int. Cl.
*G06Q 40/00* (2006.01)

(52) U.S. Cl.
USPC .......... 705/35; 705/1; 705/8; 705/10; 705/27; 707/10; 707/100; 709/218; 717/114; 717/126; 718/102

(58) Field of Classification Search
USPC ......... 705/1, 8, 10, 27; 707/10, 100; 709/218; 717/114, 126; 718/102
See application file for complete search history.

(56) References Cited

U.S. PATENT DOCUMENTS

| | | | | |
|---|---|---|---|---|
| 5,963,739 | A * | 10/1999 | Homeier | 717/126 |
| 2001/0044757 | A1* | 11/2001 | Robb et al. | 705/27 |
| 2005/0246350 | A1* | 11/2005 | Canaran | 707/100 |
| 2006/0155562 | A1* | 7/2006 | Kano et al. | 705/1 |
| 2007/0043827 | A1* | 2/2007 | Banerjee | 709/218 |
| 2007/0083421 | A1* | 4/2007 | McNair et al. | 705/10 |
| 2007/0130152 | A1* | 6/2007 | Kosov et al. | 707/10 |
| 2009/0006167 | A1* | 1/2009 | Toussaint et al. | 705/8 |
| 2009/0064104 | A1* | 3/2009 | Baeyens et al. | 717/114 |
| 2009/0070764 | A1* | 3/2009 | Guizar | 718/102 |

OTHER PUBLICATIONS

Definition of word "transform" from Webster's Dictionary of 1828 and 1913, two (2) pages.*
European Search Report dated May 16, 2008 which includes XP002456252.

* cited by examiner

*Primary Examiner* — James Trammell
*Assistant Examiner* — Sanjeev Malhotra
(74) *Attorney, Agent, or Firm* — Nixon & Vanderhye P.C.

(57) ABSTRACT

In certain example embodiments of this invention, systems and/or methods for managing transformations in Enterprise Application Integration (EAI) and/or Business Process Management (BPM) Environments are provided. In certain example embodiments of this invention, when a process and/or transform is defined, design-time encoding data is extracted and stored as metadata. When the process or transform is implemented, runtime data is captured and/or managed, and also stored as metadata. When new processes and/or transforms are defined, and/or when an already-defined process and/or a transform is executed, heuristics may be applied so as to suggest one or more already-existing transformation chains for use in accomplishing at least a part of the same and/or a similar process or transform.

20 Claims, 15 Drawing Sheets

SYSTEMS AND/OR METHODS FOR MANAGING TRANSFORMATIONS IN ENTERPRISE APPLICATION INTEGRATION AND/OR BUSINESS PROCESSING MANAGEMENT ENVIRONMENTS

FIELD OF THE INVENTION

The example embodiments disclosed herein relate to transformation management techniques and, more particularly, to systems and/or methods for managing transformations in Enterprise Application Integration (EAI) and/or Business Process Management (BPM) Environments. In certain example embodiments of this invention, when a process and/or transform is defined, design-time encoding data is extracted and stored as metadata. When the process or transform is implemented, runtime data is captured and/or managed, and also stored as metadata. When new processes and/or transforms are defined, and/or when an already-defined process and/or a transform is executed, heuristics may be applied so as to suggest one or more already-existing transformation chains for use in accomplishing at least a part of the same and/or a similar process or transform.

BACKGROUND AND SUMMARY OF EXAMPLE EMBODIMENTS OF THE INVENTION

Enterprise application data sources take on many different forms, such as, for example, Web Services, BAPI (Business Application Programming Interface), JDBC (Java Database Connectivity), XML (Extensible Markup Language), EDI (Electronic Data Interchange) formats and many others. Because each system is generally a stovepipe application with a specific business purpose, the semantics and structure of corresponding schema typically differ. In a traditional Enterprise Application Integration (EAI) deployment, implementers must understand these semantic differences between systems to successfully integrate across them. Furthermore, the total number of schema will increase as business requirements change.

Currently, developers write transformation code manually, sometimes using a commercially available mapping tool such as webMethods Flow graphical transformation tool, including XSLT (Extensible Stylesheet Language Transformations), or developing custom code. This process is very time consuming and often requires a significant time investment to understand the vast number of source and target systems. Besides the occasional requirements document, it often is the case that very little information about the integration is retained once the solution is deployed.

Given the complexity of transformations required for point-to-point mapping across all source and target schema, deployments often become unmanageable with time. Developers are not able to find transformations for reuse, understand dependencies to safely make a change, and/or determine the provenance of a process flow. As a result, full rewrites are not uncommon when significant change is required. Unfortunately, because that expertise only exists in a developer's head, re-developing transformations often means additional investment to analyze source and target schema when that experience is lost or simply forgotten.

This problem extends to Business Process Management (BPM) as well. Service schema must be mapped into the context of a business process when the function of the service is required to implement the process (e.g., each time they are dragged into a process canvas). Semantic differences and impedance mismatch problems lead to the same kind of maintenance problems that exist with traditional EAI. Furthermore, these implicit mappings are not made available for reuse. The net impact is that each service has to be manually mapped into a process every time it is used, regardless of whether a mapping may exist.

The general approaches to EAI and BPM result in a number of further complications and/or drawbacks in terms of transformation management. For example, transformation logic is often tightly coupled to business logic, which reduces the flexibility and reusability of the applications. Data paths and relationships tend to be largely hidden in embedded logic. Semantic inconsistencies and structural impedance mismatch issues reduce the ability for a business to quickly change. This sometimes manifests itself, for example, through the impedance mismatch of data flow during business process development and maintenance. It is also often difficult to distribute the data processing overhead in such environments.

Thus, it will be appreciated that there is a need in the art for systems and/or methods that overcome one or more of these and/or other disadvantages. It also will be appreciated that there is a need in the art for improved transformation management techniques.

An example aspect of certain example embodiments of this invention relates to systems and/or methods operable among and/or between both EAI and BPM environments.

Another example aspect of certain example embodiments relates to techniques for providing suggestive transforms in connection with EAI and/or BPM environments.

Still another example aspect of certain example embodiments relates to extracting design-time encoding data and storing the same as metadata when a process and/or transform is defined, capturing and/or managing runtime data and also storing the same as metadata when the process or transform is implemented, and suggesting one or more already-existing transformation chains for use in accomplishing at least a part of a new process and/or transform and/or a similar process or transform based on the metadata and/or a heuristic applied thereto.

In certain example embodiments of this invention, a method of suggesting a transform for use in enterprise application integration (EAI) and business process management (BPM) environments is provided. At least one predefined EAI transform and/or BPM process flow is provided. A shared storage location configured to hold data corresponding to extracted design-time and runtime data extracted from the at least one predefined EAI transform and/or BPM process flow during encoding and runtime, respectively, is provided. A new EAI transform and/or BPM process flow is created. During the creating of the new EAI transform and/or BPM process flow, a similar predefined EAI transform and/or BPM process flow for use in connection with the new EAI transform and/or BPM process flow is located. The similar predefined EAI transform and/or BPM process flow is stored in the shared storage location and is located based on a search strategy. The new EAI transform and/or BPM process flow is capable of being executed within both of the EAI and/or BPM environments.

In certain example embodiments, a system for suggesting a transform for use in enterprise application integration (EAI) and business process management (BPM) environments is provided. A transform storage location storing program logic corresponding to at least one predefined EAI transform and/or BPM process flow is provided. A shared storage location is configured to hold extracted data corresponding to design-time and runtime data extracted from the at least one predefined EAI transform and/or BPM process flow during encoding and runtime, respectively. Transform creating program logic for creating a new EAI transform and/or BPM process flow is provided. There is provided suggestive program logic for locating, during the creating of the new EAI transform and/or BPM process flow, a similar predefined EAI transform and/or BPM process flow for use in connection with the new EAI transform and/or BPM process flow, with the similar predefined EAI transform and/or BPM process flow being stored in the shared storage location and being located based on a search strategy. The new EAI transform and/or BPM process flow is capable of being executed within both of the EAI and/or BPM environments.

In certain example embodiments, a suggestive transform engine for suggesting a transform for use in enterprise application integration (EAI) and business process management (BPM) environments is provided. Programmed logic circuitry is provided for locating, based on a search strategy, during user creation of a new EAI transform and/or BPM process flow, a similar predefined EAI transform and/or BPM process flow for use in connection with the new EAI transform and/or BPM process flow in a shared storage location comprising metadata corresponding to design-time and runtime data extracted from the at least one predefined EAI transform and/or BPM process flow during encoding and runtime, respectively. The new EAI transform and/or BPM process flow is capable of being executed within both of the EAI and/or BPM environments.

In certain example embodiments, a method of suggesting a transform for use in first and second integration environments is provided. At least one predefined transform is defined for the first and/or second integration environments. A shared storage location is configured to hold data corresponding to extracted design-time and runtime data extracted from the at least one predefined transform during encoding and runtime, respectively. A new transform is created. During the creating of the new transform, a similar predefined transform is located for use in connection with the new transform, the similar predefined transform being stored in the shared storage location and being located based on a search strategy. The new transform is capable of being executed within both of the first and/or second integration environments.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
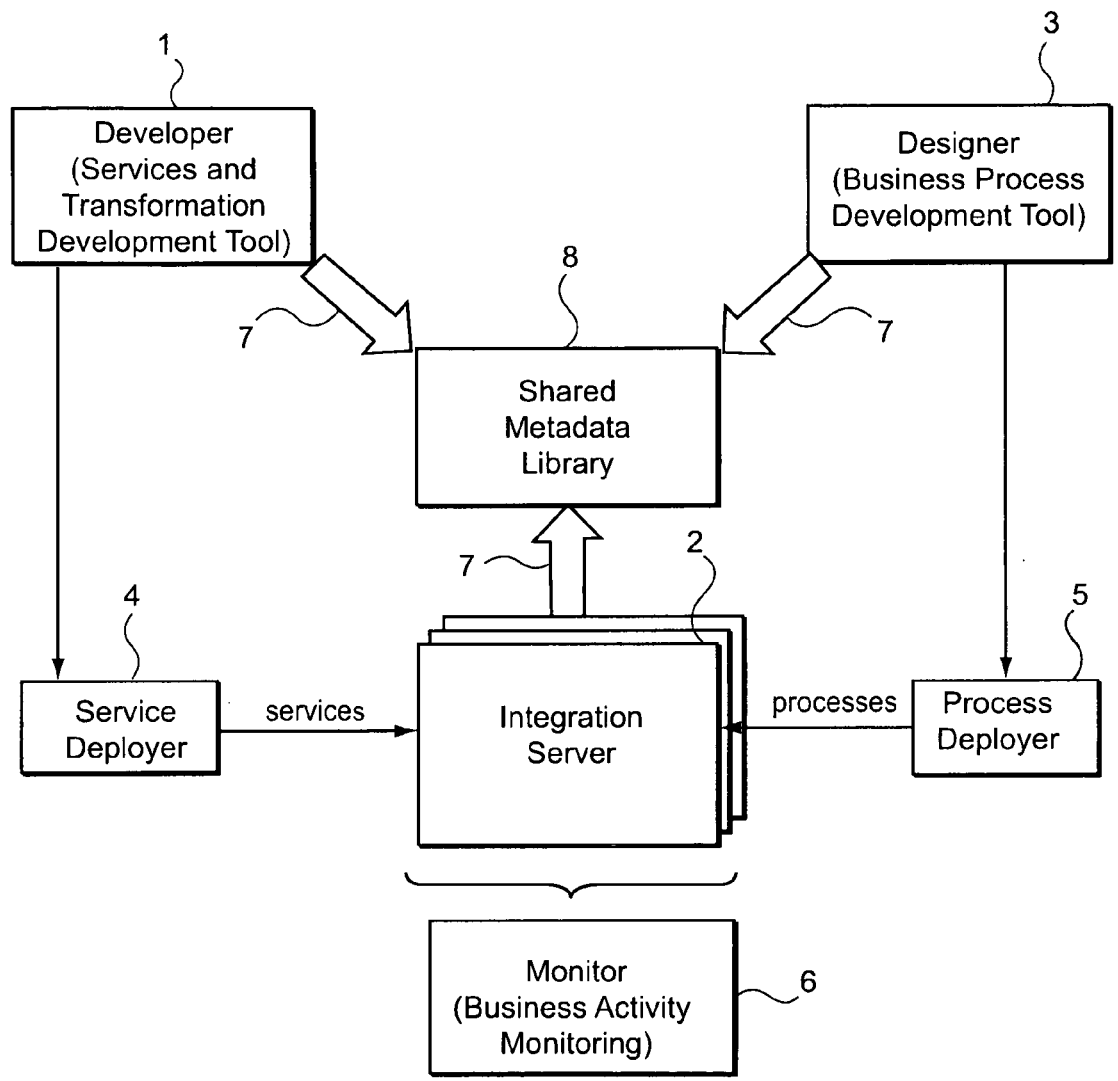
FIG. 1 is an illustrative high-level view of a system for providing suggestive transforms in accordance with an example embodiment.

Certain example embodiments elevate the importance of service transformations within integration environments beyond conventional levels so as to at least increase the ease of maintaining such a system. Explicit management of schema, transformation, pipelines, and/or the like, is possible via certain example embodiments that include features such as, for example, discovery, dependency/impact analysis, suggested use/reuse, etc., and thus may substantially reduce the amount of time spent integrating systems. Additionally, certain example embodiments may provide an on-ramp to automatically suggest mappings to a BPM user when the function of the service is required to implement the process (e.g., when a service is dragged onto a canvas).

Thus, certain example embodiments may provide a level of abstraction to help automate the assembly of services pipelines. Certain example embodiments may also increase transparency of data and make data paths across processes and/or services much clearer. Loose coupling may be improved by separating concerns between a data producer and data consumer. In certain example embodiments, a bottom-up foundation may be re-organized to reflect a higher level data model as it emerges. Events may be transformed into a normalized form for analysis (e.g., CEP or Complex Event Processing). Certain example embodiments also may provide a means to assess data transformation overhead and thus offer potential areas for streamlining business processes.

Advantageously, certain example embodiments may allow service-oriented architecture (SOA) infrastructures to tackle problems in delivering business intelligence. This may further encourage the decoupling of business users from information technology specifics, e.g., over existing SOA infrastructures. Also, the redundancy of work in implementing services may be reduced, e.g., by reducing the number of data services with a similar function but different inputs and outputs, especially when inputs and outputs can be re-purposed through transformations. Advantageously, the separation of services and transformations also may encourage better control of quality through better defined testing and quality assurance.

These advantages may be realized in certain example embodiments by, for example, promoting transformations and business documents as first class objects, partitioning business and technical artifacts to facilitate reuse, exposing data operations as a service, providing a layer to facilitate optimal data driven decision support, providing data lineage capabilities, providing vocabulary driven transformations, and/or extending and innovating around model driven transformation management.

More particularly, at least two kinds of data transformations are contemplated, including business and technical transformation. Business transformations are those that allow business users to "mix and match" data for analyses within the context of business intelligence and composite applications. Technical transformations are those that adapt input and outputs of SOA artifacts, enabling, for example, speedier implementation of business processes.

Data transformations may be managed as first class reusable SOA business/technical artifacts among processes, tasks, composite applications, and/or services in certain example embodiments. Thus, in certain example embodiments, there is provided a method for extracting information from document mappings to create a knowledge base such that, for example, information about data structures, functions, and semantics are captured. In such cases, using semantic metadata, compatible transformations may be automatically (or semi-automatically) generated based on existing metadata as new requirements are introduced into the system in certain example embodiments. Furthermore, certain example embodiments may enable automated transformation generation using semantic technology, allowing non-obvious connections to be made.

1. System Overview

FIG. 1 is an illustrative high-level view of a system for providing suggestive transforms in accordance with an example embodiment. In FIG. 1, the developer 1 is a development tool for creating services, document types as inputs and outputs, as well as data transformations functions. Services may be created from in a scripting language (e.g., as Flows, as described below), C/C++ code, Java code, as wrappers to external web services, etc.

The designer 3 is a development tool for business process definitions. A business process may contain many steps, to be executed in serial or parallel. Some steps are human tasks, whereas some steps are data integration and/or processing or retrieval steps. The latter usually are realized by calling services on the integration server 2 at run-time.

The integration server 2 is a run-time server configured to enacting all services. Multiple instances of an integration server 2 may be required for availability and/or scalability. The services deployer 4 takes the services definitions and deploys them into the run-time integration server 2. The processes deployer 5 deploys process definitions as services in the runtime integration server 2. Monitor 6 monitors the activities of the runtime servers.

Metadata 7 about design time and run time assets (e.g., Processes, Tasks, Services, DocumentTypes (described in greater detail below) as inputs and outputs) are extracted from respective components, and are published to the shared metadata library 8. This employs many asset specific extractors, at least one for each type of asset. The shared metadata library 8 stores the metadata 7 of design time and runtime assets. It serves as a searchable catalogue of assets for developer 1 and designer 3. The metadata 7 may be stored as a graph of associated assets, such that asset dependencies and impact analysis can also be performed. The shared metadata library 8 aids the development process through serving designer 1 and developer 3.

Exemplary aspects of each of the example components will be provided in greater detail below. However, it will be appreciated that the above architecture is illustrative in nature. In certain example embodiments, other example system components may be used in place of or in connection with the example components listed above. In certain example embodiments, the functionality of one or more components may be shared and/or split among different components. For example, in certain example embodiments, the designer 1 and the developer 3 may be implemented as a common component.

2. Example Enterprise Application Integration Related Components

This section first describes several example EAI-related transforms and common formats thereof. It then indicates how design-time encoding data may be extracted from such transforms and stored as metadata. Similarly, this section concludes by indicating how run-time data may be captured and/or managed and stored as metadata. The metadata derived from extracting, capturing, management, etc., EAI-related transform data may be stored and, as will be described in greater detail below, may facilitate the searching for and/or suggesting of transformations in connection with certain example embodiments.

2.1 Example Transforms

Transforms may take on many forms. This section provides a brief overview of several EAI-related transforms that may be used in connection with, and/or serve as a basis for, certain example embodiments. It will be appreciated that the transforms presented below are provided by way of example and that certain example embodiments may be configured to work with these and/or other transform types. It also will be appreciated that the Integration Server (IS) described below can be any suitably configured integration server, and the example embodiments disclosed herein are not to any particular IS or IS instance. Moreover, certain example embodiments may function without any IS at all.

2.1.1 Example Flow-Type EAI Transforms

Within an EAI environment, transforms or schema maps may be implemented as flow services. In connection therewith, document mapping may be performed, and/or one or more of an IS schema, IS document type, and specification may be defined, further details for each of which will be provided below. A flow service is a service that encapsulates a sequence of services within a single service and manages the flow of data among them. Data mapping is the process of performing transformations to resolve data representation differences between services or document formats. Mapping may accomplish the following types of example data transformations: name transformations, where different variable names represent the same data item; structural transformations, where different data structures represent a data item; and value transformations, where different formats represent the same value. When structural transformations are performed, the value of the variable remains the same, but the data type or position of the variable in the document structure changes. When value transformations are performed, the name and position of the variable remain the same, but the data contained in the variable changes. It will be appreciated that the different kinds of transforms described herein are not mutually exclusive. For example, a transform might perform some of all of these kinds of example operations.

Basic mapping tasks are the tasks that can be performed to manage the pipeline contents and the values of variables in the pipeline. For example, variables may be linked to each other (e.g., the value of a variable in one service or document format may be copied to a variable in another service or document format); values may be assigned to variables (e.g., variable values may be hard coded or variables may be assigned a default value); variables may be dropped from the pipeline (e.g., pipeline variables that are not used by subsequent services in a flow may be dropped); and/or variables may be added to the pipeline (e.g., variables that were not declared as input or output parameters of the flow service may be added, as may input and output variables for services that the flow service invokes). Transformations also may be accomplished by executing program logic.

An IS schema may be a "free-standing" element that acts as the blueprint or model against which an XML document may be validated. The IS schema provides a formal description of the structure and content for a valid instance document (e.g., the XML document). The formal description is created through the specification of constraints. An IS schema may include structural constraints and/or content constraints. A structural constraint in an IS schema describes the elements, attributes, and/or types that appear in a valid instance document. For example, an IS schema for a purchase order might specify that a valid <lineItem> element must consist of the <itemNumber>, <size>, <color>, <quantity>, and <unitPrice> elements, in that or another order. A content constraint in an IS schema describes the type of information that elements and/or attributes can contain in a valid instance document. For example, the <quantity> element might be required to contain a value that is a positive integer.

In brief, an IS schema may be created based on an existing DTD (Document Type Definition) referenced by an XML document, based on a DTD, and/or based on an XML Schema definition.

An IS document type includes a set of fields used to define the structure and type of data in a document. An IS document type may be used to specify input or output parameters for a service or specification. An IS document type also may be used to build a document or document list field and as the blueprint for pipeline validation and document validation. In general, IS document types may be created by: (1) creating an empty IS document type and defining the structure of the document type by inserting fields; (2) creating an IS document type from a source file, such as an XML schema, DTD, or XML document, enabling the structure and content of the IS document type to match that of the source file, and/or (3) creating an IS document type from a broker document type.

A specification is a "free-standing" IS element that defines a set of service inputs and outputs. If there are multiple services with the same input and output requirements, each service may be pointed to a single specification rather than manually specify individual input and output fields in each service.

2.1.2 Example Canonical Management Using Schema and Transforms

Transformations also may be facilitated through the use of canonicals. Thus, for example, the "transformation management" techniques of certain example embodiments may be facilitated through the use of canonicals, as fewer documents and overall transformations may be needed with the pattern. In essence, a canonical helps establish a "contract" for each participating application in an EAI environment to facilitate connections between disparate applications, often in a hub-and-spoke arrangement. A canonical is a document type that corresponds to an enterprise-wide representation of a certain business object. A canonical helps define a common business document definition to assist in integrating business objects between multiple systems, where each system has a different representation of the same business object. Use of canonicals provides a scalable approach to developing and maintaining integrations by eliminating point-to-point integrations.

Canonicals typically have the following characteristics. Canonicals may have multiple subscribers, such that there are multiple subscribers interested in a single canonical. Canonicals may represent a superset of required data. Canonicals typically contain a superset of the fields for the object they represent. Not all subscribers need all the fields and structures in the canonical. Subscribers can then simply parse the fields that they need. Therefore, when using canonicals, business and transformation logic is necessary on the subscriber's adapter to translate the data into his/her needs.

Canonicals enable users to define maps from each backend document formats to the canonical format and vice versa only, reducing the need to define maps directly from one backend format to another. Therefore, canonicals reduce the number of maps needed to support document exchange. An integration solution using canonicals offers many other benefits over point-to-point integration solutions. There may be fewer document types and integration logic to define and manage. Loose coupling may be enabled, such that, for example, if the backend format changes, a change is required to just one or two maps (canonical format→backend format) instead of n maps in the point-to-point scenario. As familiarity with the canonical format grows with each implementation, the time-to-implement may speed up.

The following are considered by some to be best practices with respect to canonical usage. First, canonicals should be defined. Second, the business process logic of subscribing integrations should be described. Third, the design of subscribing integrations should be documented. Fourth, use of "deliver" document should be reduced. Fifth, error-handling scenarios should be defined. Sixth, Request/Reply and Publish/Subscribe processes should be separated to achieve loose coupling in Request/Reply scenarios. It will be appreciated that the foregoing is illustrative in nature and indicative of only one set of best practice usages with respect to canonicals.

A canonical strategy may include an industry standard canonical, a custom canonical, or a hybrid approach.

2.1.3 Illustrative Screenshot of an Example EAI Transform

Figure 2:
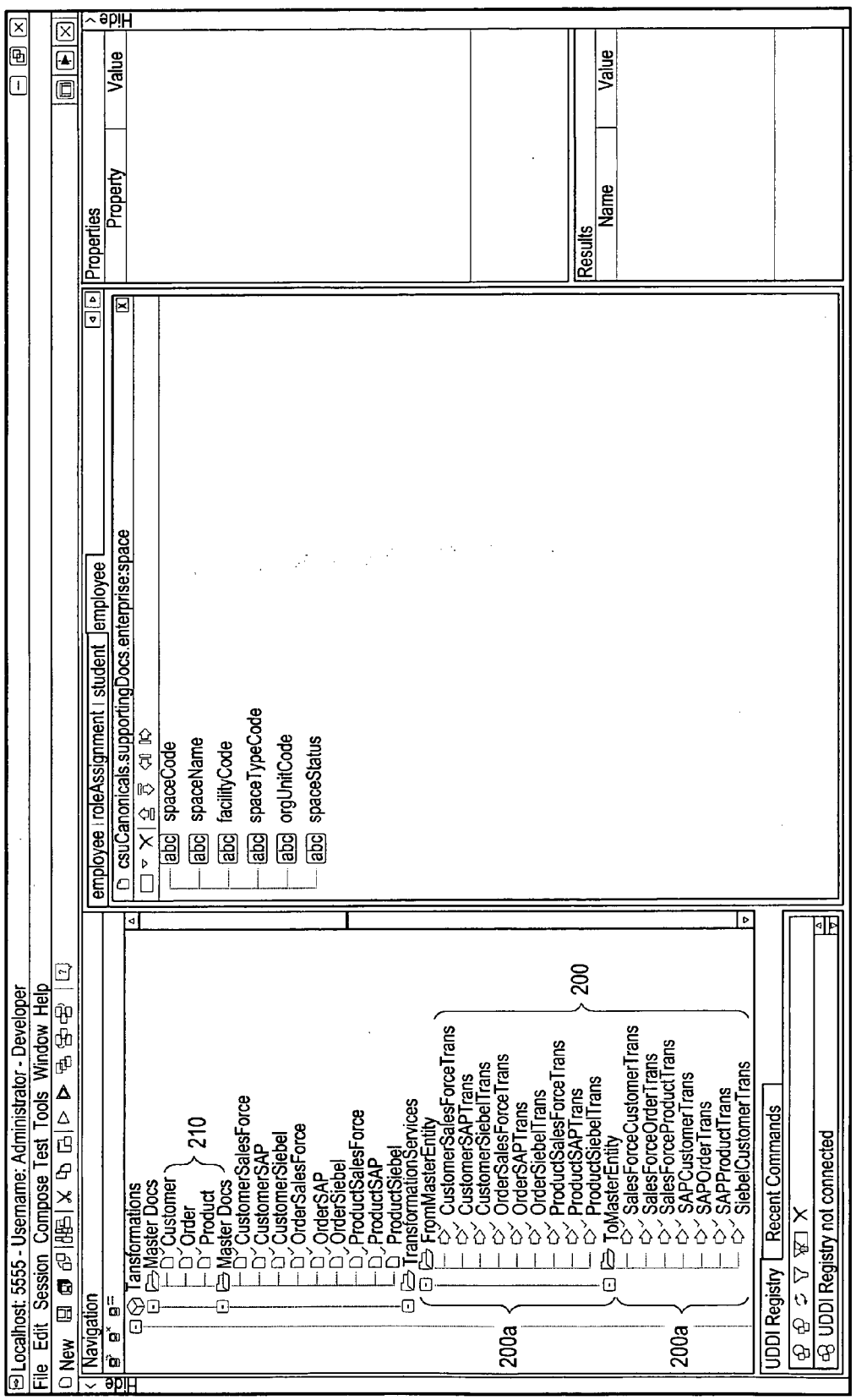
FIG. 2 is an illustrative screenshot of an example EAI transform including deployed services and schema.

FIG. 2 is an illustrative screenshot of an example EAI transform including deployed services and schema. In the FIG. 2 example, each service is implemented with corresponding input/output schema. A simple set of services 200 has been created that transform data in (200a) and out (200b) of three known canonical types 210—Customer, Order, and Product. The transformations manage data in and out of three sample systems—namely, SAP, Siebel and SalesForce. The transformations have been created for data flow in and out of each service through the canonical types. This trivial example includes flows and schema that are "no-ops," although it does illustrate the existence of dependencies. Furthermore, in the example, the arrow icons represent flow services and the documents are input/output schema.

2.2 Extracting Encoding Data

This section provides an overview of example asset search and discovery routines through an illustrative scenario of building a composite application. The section provides an overview of the metadata format, and briefly describes how the search tasks are realized, through semantics such as sub-classes, sub-properties, inverse relationships, and transitivity. It also outlines the organization of the metadata for several assets and, in some cases, traces their lifecycle from inception to their consumption.

Certain example embodiments may function with one or more of the following asset types: External Web Services, Internal Databases, WS Connector Service, JDBC Services, Reusable Document Types as inputs and outputs of services, Flow Service as Transformations, and CAF Portlets and Views.

An introduction to the metadata of services and related assets, extraction, and reference graph will first be provided. It is followed by a series of example steps a developer might take when providing encoding data.

2.2.1 Services, Specification, and Document Types

The Service is a broad category of reusable services and are executed within the Integration Server. A service can be implemented in a variety of ways, some may even conform to abstract specifications (Specification). Document Types are data structures containing state that gets passed between Services. They are the currency of data flow among the services.

Each Service may or may not implement a separately defined Specification. Each Service or Specification has one input and one output. The simplest input/output is a single field of primitive value type. Document Types are used when input/output types are not simple. Document Types are structures containing data fields, and the document types can be nested within one another. A Service may also be implemented by a combination of lower level Services, delegating calls and reuse functionalities.

Figure 3:
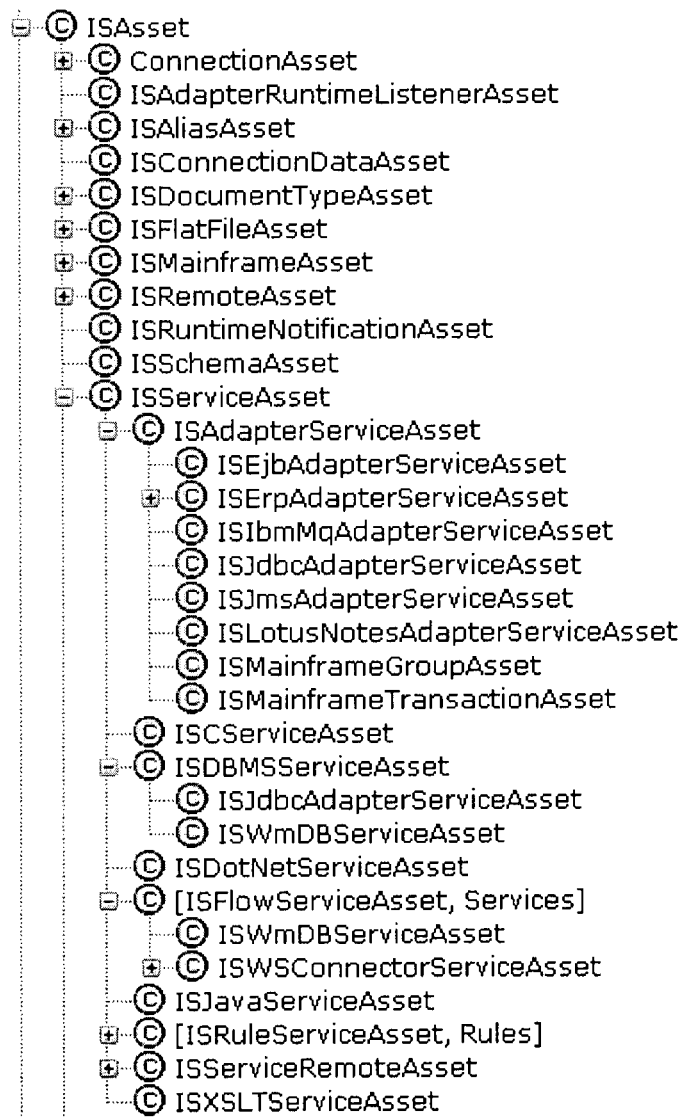
FIG. 3 is a hierarchical view of example Service Assets.

The hierarchy of Services breaks down into, for example, Adapter Services, which are services front ends to external systems such as SAP, RDBMS, and Mainframes; services whose definition was defined in a dataflow language (Flow Services), of which Web Service Connector is an example; services that represents Blaze Rules (Rule Services); and services that are implemented in common programming languages (C#, java, C). FIG. 3 is a hierarchical view of example Service Assets. These may be implemented as classes, for example, which may exist in a repository or knowledge base.

2.2.2 Metadata Extraction, References, and Dependencies

The metadata for each asset may be organized like an object class. Each asset is described using:

- An identifier unique across all development and runtime components. The same service deployed on a different Integration Server may have a different identifier. This may be a URI (Universal Resource Indicator).
- Many literal valued properties, e.g., name, urlLocation, last modified, etc.
- A structure of other assets. This is a mechanism to further group properties together. For example, a field in a Document Type may only exist within the context of its parent Document Structure.
- May be "contained" in other assets. For example, IS Folder is contained in another IS Folder, or a IS Package. The containment notion here is different to the structural organization of an asset's metadata.
- May "reference" other first class assets. For example, a service may have document types as inputs and outputs, may call other services during its execution, and may conform to a specification, etc.

Figure 4:
FIG. 4 is example metadata of an Flow Service Asset, showing relationships to inputs, outputs, and other services that it uses.

FIG. 4 is example metadata of an Flow Service Asset, showing relationships to inputs, outputs, and other services that it uses.

An asset's metadata extractor only extracts data it owns, such as, for example, data about itself, including data of all its "derived" assets and pointers to other contained or referenced assets. The types of relationships mentioned—derived, contained, reference—together form the main graph of asset dependencies.

Figure 5:
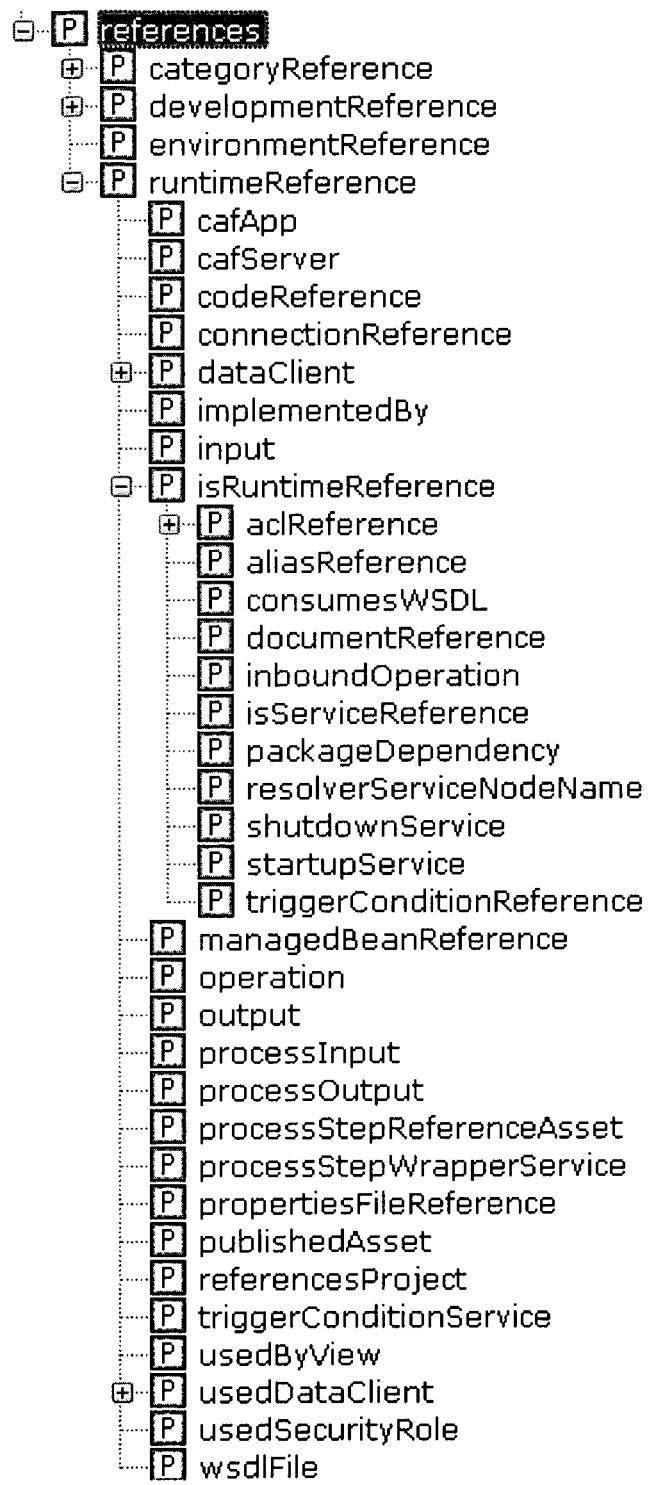
FIG. 5 is an excerpt of the reference property hierarchy.

As noted above, there can also be many kinds of "references," all of which contribute to the dependency chain, but their differentiation may enable more targeted searches as their original meaning and intention are captured. Furthermore, each individual property is tied to specific domains and ranges, which may be used to automatically classify the type of assets being described, without explicitly asserting it. FIG. 5 is an excerpt of the reference property hierarchy.

The notion of "references" is transitive. The "references" property also has an inverse "referencedBy." As extractors are not concerned with how their metadata are being used, they only extract pointers in one direction. The notion of "inverse" reference in the metadata library provides a means to traverse and search this graph in both directions.

Depending on the context of what users are looking for, it is the same reference graph that is often referred to as "call-graph," "reference-chain," or "dependency-chain." Consider a Service (A) references a Document Type (x) as its input, calls another Service (B) during execution, which in turn calls a third Service (C). From a high level, they are all references, and A is a "dependent" of all x, B, and C; if either one changes, A is in the impact set. However, if the context is a call graph, then only the reference A runtimeReferences B, and B runtimeReferences C are relevant.

Table 1 enumerates example types of reference relationships that exist today in commercially available products. The following references are recursive references: Process and Processes (child processes); Service and Services (caller and callee); Document Types and Document Types (associations); and Packages and Packages (dependency).

TABLE 1

An example reference chain table.

| Individual of type | "Relates to" | Actual chain of relationships in metadata |
|---|---|---|
| ISLogicalDocumentAsset | Document | ISLogicalDocumentAsset - documentFieldReference-> ISLogicalDocumentAsset, ISLogicalDocumentAsset - documentFieldReference-> DocumentFieldAsset- documentReference-> ISDocumentTypeAsset (or ISDocumentReferenceAsset) |
| Document | Document | ISDocumentTypeAsset - documentFieldReference-> DocumentFieldAsset |
| Document | Document | ISDocumentTypeAsset - documentFieldReference-> ISDocumentTypeAsset |
| Process | Process | ProcessAsset-processStep-> ProcessStep- processStepReferenceAsset-> ProcessAsset |

TABLE 1-continued

An example reference chain table.

| Individual of type | "Relates to" | Actual chain of relationships in metadata |
|---|---|---|
| Process | Services | ProcessAsset-processStep-><br>ProcessStep-<br>processStepReferenceAsset-><br>ISServiceAsset |
| Process | Tasks | ProcessAsset-processStep-><br>ProcessStep-<br>processStepReferenceAsset-><br>TaskTypeAsset |
| Process | Rules | ProcessAsset-processStep-><br>ProcessStep-<br>processStepReferenceAsset-><br>RuleServiceAsset |
| Process | Document | ProcessAsset-processOutput-><br>ISDocumenTypeAsset (or<br>ISLogicalDocumentType) |
| Process | Document | ProcessAsset-processInput-><br>ISDocumenTypeAsset (or<br>ISDocumentReferenceAsset) |
| Process | BizDocument | ProcessAsset-processInputs-><br>TnDocTypeAsset (or<br>TnDocTypeRemoteAsset) |
| Process | Package | |
| Process | BizDocument | Via: ProcessAsset-processStep-><br>ProcessReceiveStepAsset-<br>processStepReferencedAsset-><br>TnBizDocRemoteAsset |
| Process | Views | Via: TaskTypeAsset |
| Process | Document | Via: TaskTypeAsset |
| Process | Document | Via: ISServicesAsset |
| Process | Document | Via: RuleServiceAsset |
| Process | Web Service | Via: ISServicesAsset |
| Services/Specification | Documents | ISServiceAsset (or<br>ISSpecificationAsset) -input-><br>ISLogicalDocumentAsset |
| Services/Specification | Documents | ISServiceAsset (or<br>ISSpecificationAsset) -output-><br>ISLogicalDocumentAsset |
| Services/Specification | Documents | ISServiceAsset (or<br>ISSpecificationAsset) -input-><br>DocumentFieldAsset -<br>documentReference-><br>ISDocumentTypeAsset |
| Services/Specification | Documents | ISServiceAsset (or<br>ISSpecificationAsset) -output-><br>DocumentFieldAsset -<br>documentReference-><br>ISDocumentTypeAsset |
| Services | Specification | ISServiceAsset -developmentReference-><br>ISSpecificationAsset |
| Services | Services | ISServiceAsset-isRuntimeReference-><br>ISLogicalService-implementedBy-><br>ISServiceAsset |
| Services | Web Services | ISServiceAsset-hasOutboundOperation-><br>ISWSDConsumerAsset-<br>consumesWSDL->WSDLAsset |
| Web Service | Services | WSDLAsset-wsdlProducedBy-><br>ISWSDProducerAsset -<br>inboundOperation-> ISServiceAsset |
| Task | Portlet | TaskTypeAsset-portletList (inverseof<br>taskTypeReference)->PortletAsset<br>(taskTypeContainingPortlet) |
| Task | Document | TaskTypeAsset -output-><br>ISLogicalDocumentAsset |
| Task | Document | TaskTypeAsset -input-><br>ISLogicalDocumentAsset |
| Task | SecurityRole | TaskTypeAsset -usedSecurityRole-><br>SecurityRole |
| Task | Web Service | Via: ViewAsset, or ViewAsset and<br>ISService |
| Task | Services | Via: ViewAsset |
| Task | View | Via: PortletAsset |
| Portlet | View | PortletAsset-portletContainedView<br>(inverseof portletReference)-><br>ViewAsset |

TABLE 1-continued

An example reference chain table.

| Individual of type | "Relates to" | Actual chain of relationships in metadata |
|---|---|---|
| Portlet | Web Service | Via: ViewAsset |
| View | Services | ViewAsset-dataClientList-> CAFWSClientAsset- isServiceReference->ISServiceAsset (or ISServiceReferenceAsset) |
| View | Web Services | ViewAsset-dataClientList-> CAFWSClientAsset-wsdlFile-> WSDLAsset |
| View | Database | ViewAsset-dataClientList-> CAFWSClientAsset- connectionReference-> JDBCDatasourceAsset |
| Rule | Document | ISRuleServiceAsset-input-> ISLogicalDocumentAsset |
| Rule | Document | ISRuleServiceAsset-output-> ISLogicalDocumentAsset |
| Folder | Package | ISFolderAsset -owningPackage-> ISPackageAsset |
| Package | Package | ISPackageAsset -packageDependency-> ISPackageAsset |

ISLogicalDocumentAsset is a derived asset to group various document fields and document types together. The structure is recursive. All calls to Services, e.g., Process to services, Views to Services, etc., may be made through the services broker and the final execution location is unknown until runtime. The metadata employs an abstract intermediate asset to capture this fact.

2.2.3 Example Steps for Extracting Metadata

The purpose of an extractor in certain example embodiments is to gleam information from physical assets to facilitate future discovery, reusability, and dependency analysis. The role of the extractor is to keep the metadata about assets in the metadata library up to date with the actual state of the assets. This section explains the set-up involved to extract necessary data and populate a metadata library. An example construction of the extractor is provided below.

Every asset type whose metadata is deemed important for reuse and discovery has an extractor defined. An extractor may be specific to only one type of asset. Alternatively, one extractor may be responsible for multiple kinds of asset, e.g., one extractor for all kinds of IS Services, another for all kinds of Document Types, etc. For each asset type, an extractor maps the structure, format and the specific information of an asset into a summary form (metadata) more suitable to be stored in the metadata library. The level of summarization depends at least in part on the level of information required for reuse and discovery.

An extractor may operate in one of several environments. For example, it can be an integral part of another component where the assets are managed, e.g., within the component where services, transformations, and business processes are created. The extraction process in this case is tightly coupled with the life cycle management of assets, such as their creation, deletion, and changes. Alternatively, an extractor may be in a publish-subscribe arrangement with the component managing the assets. In this case, an extractor is operating as a peer module where the extraction process is triggered by published life cycle events about the state of the asset it is monitoring. A third possible environment is where the extraction process is manually triggered. In this case, the extractor is loosely coupled with the asset management. Multiple extractors operating under different environments may be active simultaneously, each contributing to a part of the entire metadata stored.

Upon triggering an extractor's operation, depending on the nature of the trigger, one of the following may be its resulting action. First, if a life cycle event of an asset is received by the extractor, the event is converted to a metadata life cycle event, appropriate for the level of summarization of the asset as defined within the extractor. The event is then passed onto the metadata library. Second, if the operation was triggered manually, the extractor will bring up to date the metadata about possibly multiple assets, by comparing the metadata state as stored in the metadata library, against the most up to date state of the assets.

2.2.4 Example Extraction Views

Figure 6:
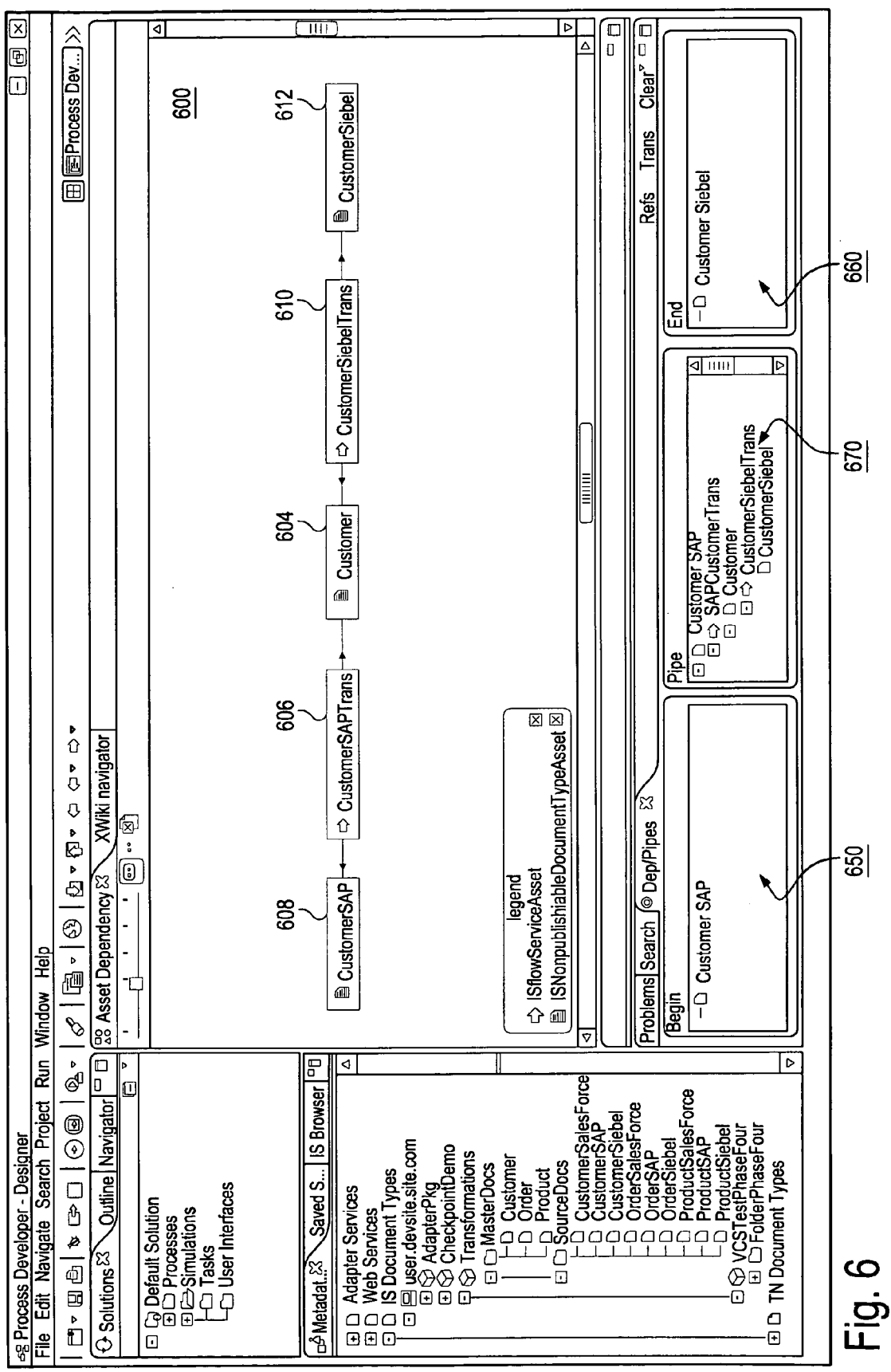
FIG. 6 is an illustrative directed graph view of extraction for a simple pipeline.

Once encoding data has been extracted, it may be visualized. FIG. 6 is, an illustrative directed graph view of extraction for a simple pipeline. It will be appreciated that FIG. 6 is at a different level of granularity to what may actually be stored in certain example embodiments. An Asset Dependency Viewer 600, which serves to enumerate all dependencies between asset types, is shown. In the Asset Dependence Viewer 600 there is shown a directed transformation pipeline or chain 602. The arrows in the graph do not show data flow, but instead have to do with the encoded relationship direction. Thus, the more generic customer document type 604 is in a relationship with the customer transaction assets from SAP (606) and Siebel (610). Each transaction asset 606/610, in turn, is in a relationship with the respective route customer document type 608/612.

Figure 7:
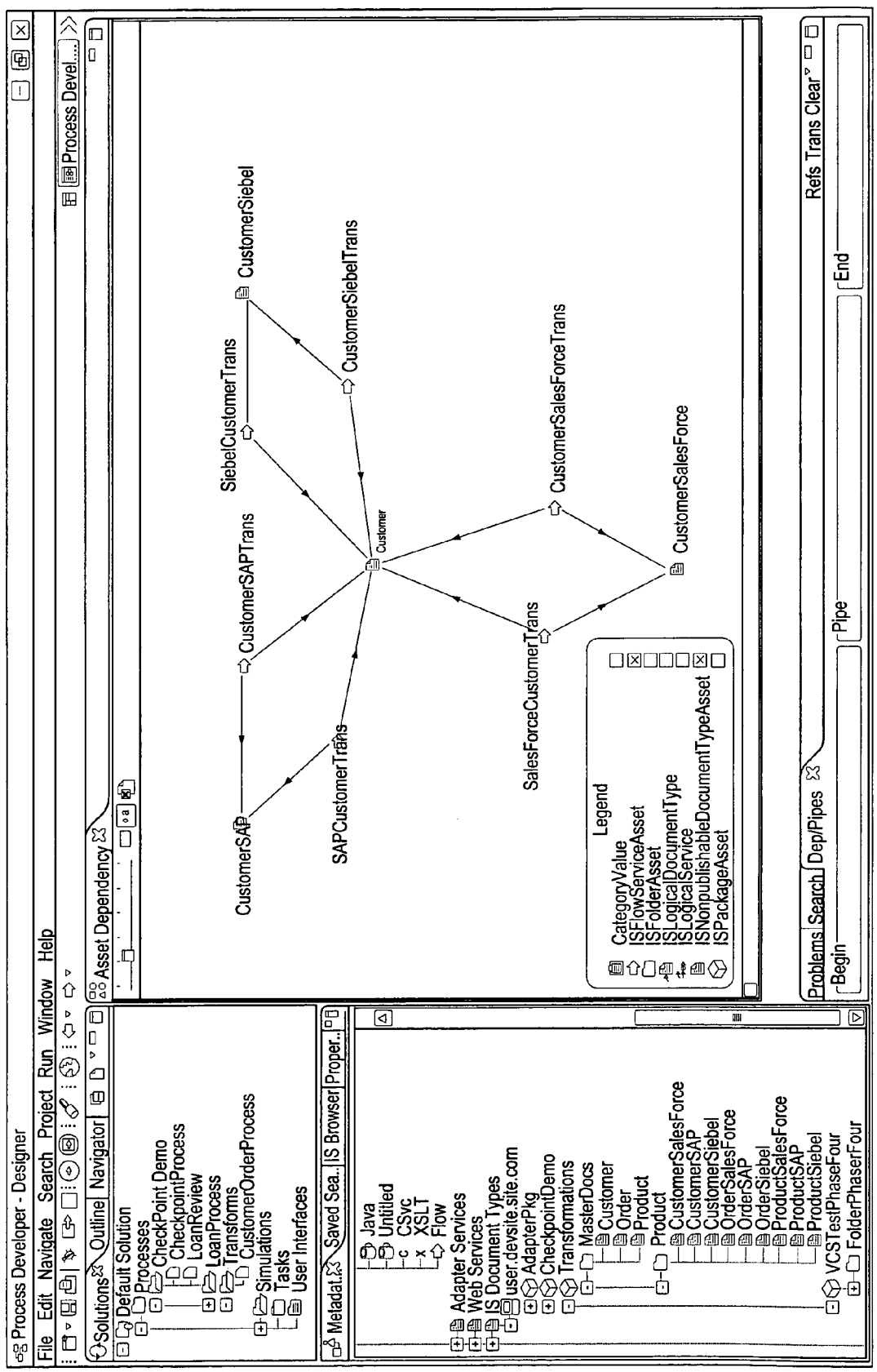
FIG. 7 shows direct service and schema dependencies for the customer document type.
Figure 8:
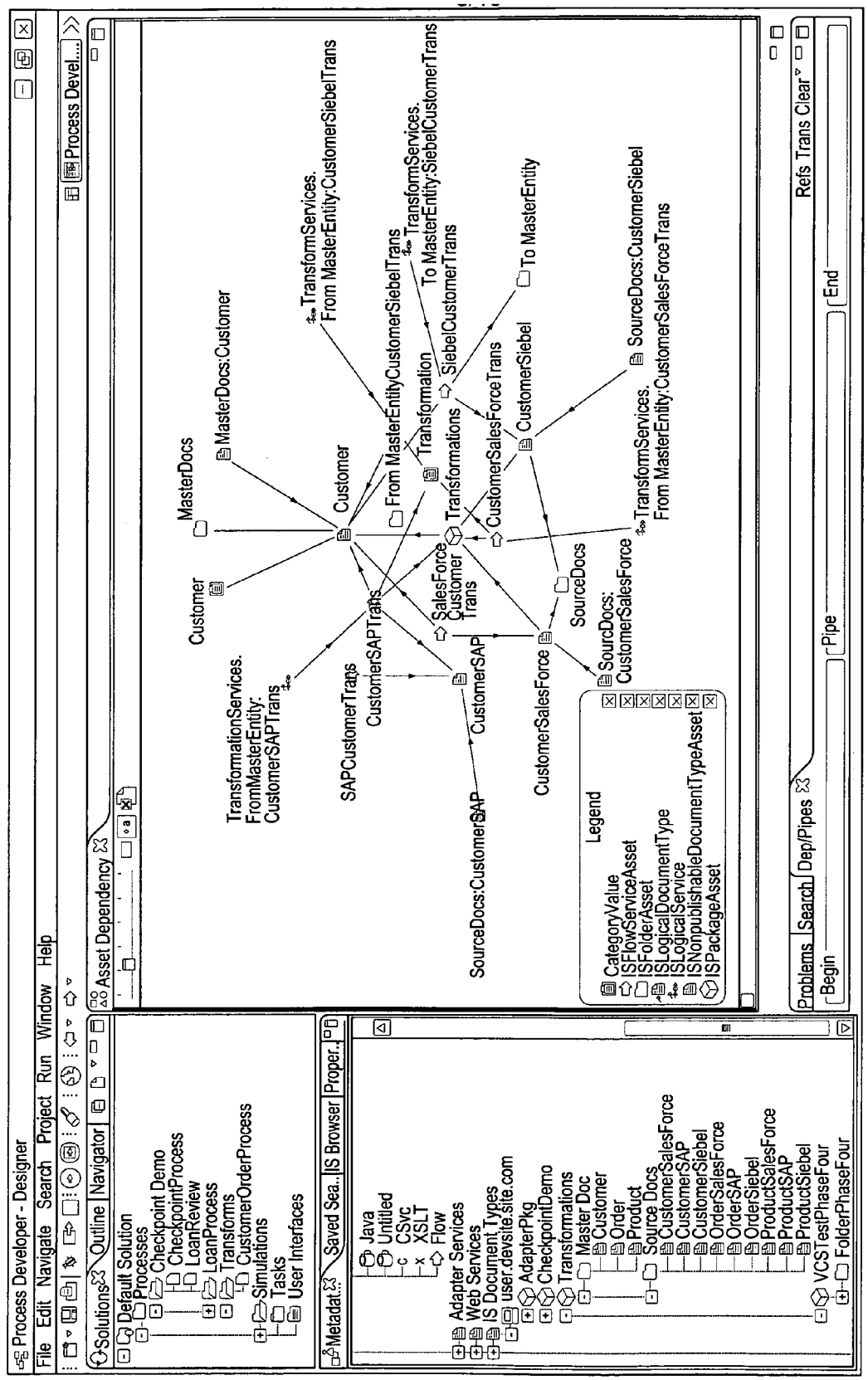
FIG. 8 shows all extracted entities for the customer document type.

FIG. 7 shows direct service and schema dependencies for the customer document type, and similarly FIG. 8 shows all extracted entities for the customer document type. As will be appreciated from FIGS. 6-8, a rich set of encoding data may be extracted from transforms when they are created. The extracted encoding data also may be stored as metadata, further processed (e.g., as described in greater detail below), and/or visually displayed.

2.3 Capturing and/or Managing Runtime Data

Data from deployed transforms (e.g., Flow Services) may be extracted to and stored in a store, such as, for example, a Metadata Library (MDL). Such a metadata library thus may store captured and/or managed runtime data. The general format and usage of the metadata corresponding to the captured and/or managed runtime may be the same as, similar to, or different from the format described above in connection with the metadata corresponding to the encoding data. The following sections will describe an example metadata library, as well as an example metadata extractor for extracting data from deployed transforms (e.g., metadata corresponding to red and/or managed runtime data).

2.3.1 Example Metadata Library

Figure 9:
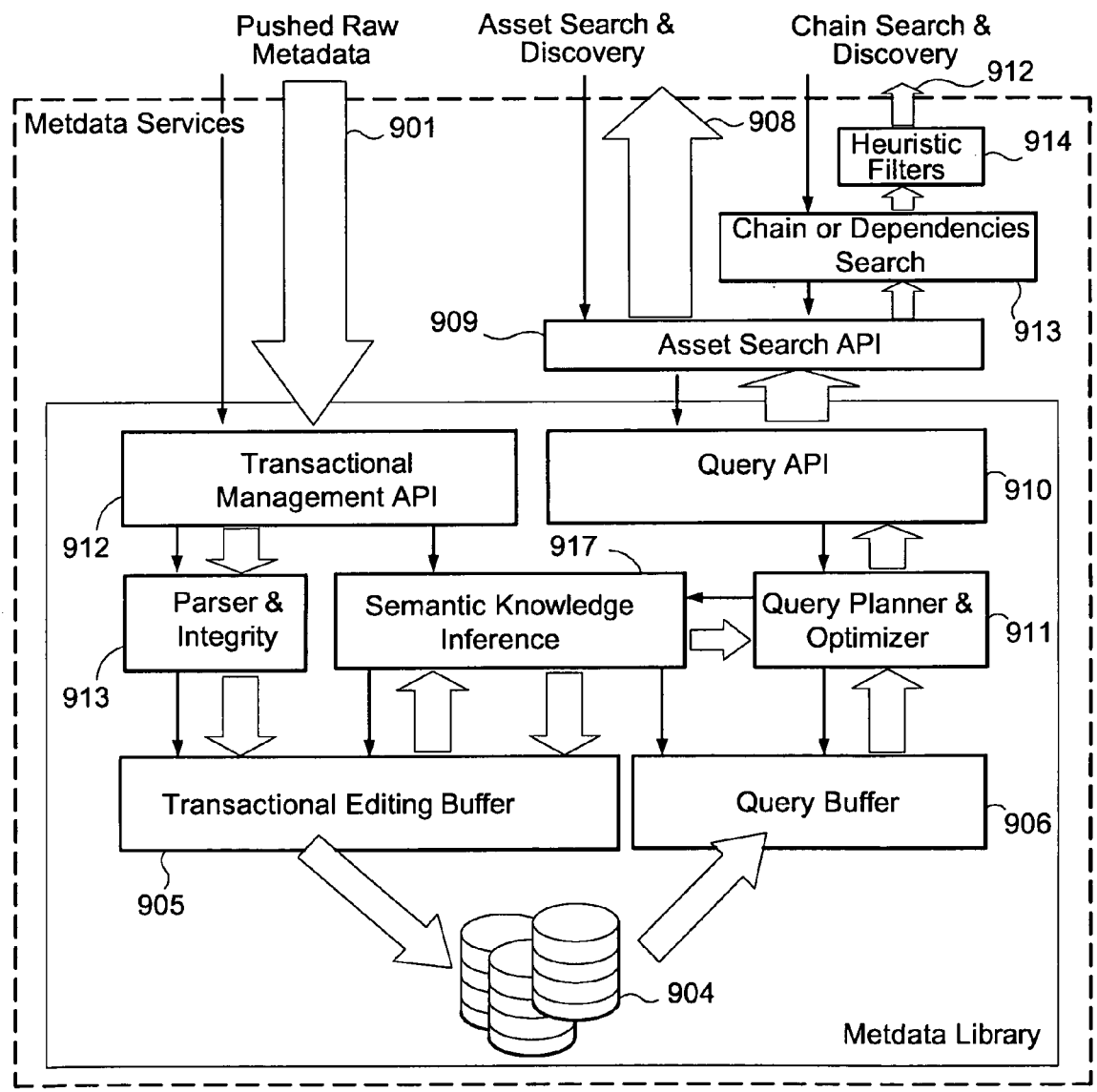
FIG. 9 is an illustrative block diagram for an example metadata library.

FIG. 9 is an illustrative block diagram for an example metadata library. FIG. 9 describes a metadata library with a generic query API, with asset search and discovery modules built on top to derive suggestions for transformations. It will be appreciated that other example arrangements are possible. For example, in certain example embodiments, the asset search and suggestion modules may be embedded with the metadata library itself as part of its services.

The arrangement of FIG. 9 is an abstract architecture of a metadata storage device. It thus highlights the necessary components to deliver transformation suggestions from a shared library of metadata. It also describes optional components that may increase the accuracy and relevance of suggestions. Many concrete implementations using may different concrete data access, organizations, and persistent mechanisms, may be used in connection with example embodiments. For example, illustrative implementations include Software AG's CentraSite, webMethods' MetaData Library; similar SOA Registry/Repository offerings from Oracle, IBM; generic RDF/tuple stores from Oracle, IBM, and others; etc. As such, it will be appreciated that the component organization diagram here is illustrative, although it does provide one way in which suggestions may be derived based on the metadata of assets from some shared persistent storage. Also, it will be appreciated that the abstract components described herein are functional components and that they may be constructed from components running on different machines in a physically different location.

A metadata storage device according to certain example embodiments may include one or more of the following features:

Ability to consistently persist data from multiple sources concurrently.

Different data from different sources are fragments of data, ultimately forming directed-graphs of connected nodes, representing asset associations and dependencies. Each node in the graphs has its own data such as node types and set of node data which are name-value pairs. In addition, each node may be related to other nodes. The type of relationship is also qualified.

Ability to retrieve nodes and their data either by direct retrieval, or via a search/query language expressive enough to answer the following types of questions:

Find node x, and retrieve its data and relationships.

Find all nodes x, where x satisfy some condition P. P may be simple condition on the node data, or relationships, or combined conditions specified in a boolean formula.

Find all node pairs of (i, j), where i has a direct relationship r to j, that all i satisfy some condition P, r satisfy some condition R, and j satisfy some condition Q.

Find all node pairs of (i, j), where i has a direct path of unknown lengths to j, via a chain of successive relationships r, and that all i satisfy some condition P, r satisfy some condition R, and j satisfy some condition Q.

Referring more particularly to FIG. 9, the narrow arrows represent requests/control messages, whereas the larger arrows indicate data flows. In FIG. 9, raw metadata 901 describing assets and relationships are pushed by different metadata extractors from outside the Metadata Library. Multiple concurrent writes from different extractors are serialized by the metadata server through transactions management to guarantee persistence and consistency. The management API 902 includes standard functions, such as, for example, those used in the creation, reading, deletion, and updating of metadata. Metadata can take different forms depending on the implementations.

The parsing and integrity checking module 903 translates the requests and the associated metadata received from the API level 902 into an internal format more appropriate to execute on the underlying persistent storage. It then validates the incoming request (create, update/delete) before committing the request to the underlying store. The validation step ensures the requests will not render the underlying store corrupted/inconsistent. Corruption/inconsistent here means the data being put in cannot be retrieved in its entirety.

The persistent storage 904 stores data in a format that can be retrieved later via a query language. The editing buffer 905 allows a request to operate on data in isolation to those data currently available for querying. The query buffer 906 allows queries to be answered using data that is in a consistent state and are isolated from editing operations being carried out concurrently.

The semantic knowledge component 907 is an optional component which may augment the metadata with additional semantic details of graph node types, data, or relationships (and thus more metadata). Additional metadata may be in the form of additional types and additional relationships. Rules about when augmentation required may be derived from a knowledge base within a description logic engine, or from a set of rules in a rule engine, or results from a statistical based analytic engine, or a hybrid of any of the above. The Asset search and discovery feature 908 is delivered as queries to the library. Such query may be specified in a language/construct different to that provided by the metadata library. Expressiveness of the language and construct are translatable into the underlying query language offered.

The query in 908 is first transformed into the query language supported by the underlying library by the asset search API 909. The query API 910 offers a simple interface: Accept a query from clients and return a set of results. The query API 910 may handle multiple query requests concurrently. Large result sets can also be paged to the client instead of handing back the entire chunk. The query is parsed and broken down into internal steps (e.g., via a query planner and optimizer module 911), amenable for retrieval planning and optimization. If component 907 is present, it may utilize the semantic knowledge to augment and improve the query plan.

The Asset chain search and discovery feature 912 is delivered as queries to the library. Similar to 909, such queries may be specified in a language/construct different to that provided by the metadata library. The Asset chain search and discovery feature 912 leverages the Asset search and discovery feature 908 for delivery. Such functionality alternatively may be embedded into the query API 910 as part of the library service in certain example embodiments. This component 913 performs the search tasks necessary to deliver transformations suggestions. Additional heuristics 914 may be used to filter or rank the suggestions. This component may be embedded within the query planner and optimizer 911 in certain example embodiments.

2.3.2 Example Metadata Extractor

The metadata extractor of certain example embodiments enables a user to manage extractions at an asset level. More particularly, the metadata extractor may provide a mechanism for building an extraction, allow the extraction in whole or in part to be published to a store (e.g., a metadata library), and/or abstract away intimate knowledge about the current state of the asset's extraction. The extractor in certain example embodiments may be "unintelligent," such that it is concerned with either extracting their current state or removing an extraction from a metadata library.

The metadata extractor of certain example embodiments may be viewed at a high level as including two components, an Extraction and a Publisher. The Extraction is a mechanism to hold an extraction for a given asset, whereas the Publisher is the mechanism for which an extraction will be submitted to be published to an appropriate store.

2.3.2.1 Example Extraction Component

An extraction, in general, defines metadata about a particular asset. An asset's extraction includes attributes and asset types for that asset and optionally a collection of assets that are defined to be part of that asset's extraction (with their own attributes and asset types as well).

The Extraction component may include an AssetExtraction and/or an Asset. An AssetExtraction defines metadata about an asset and optionally includes a collection of assets that are part of that asset's extraction. An Asset defines an asset by its URI, asset attributes, and asset types.

Figure 10:
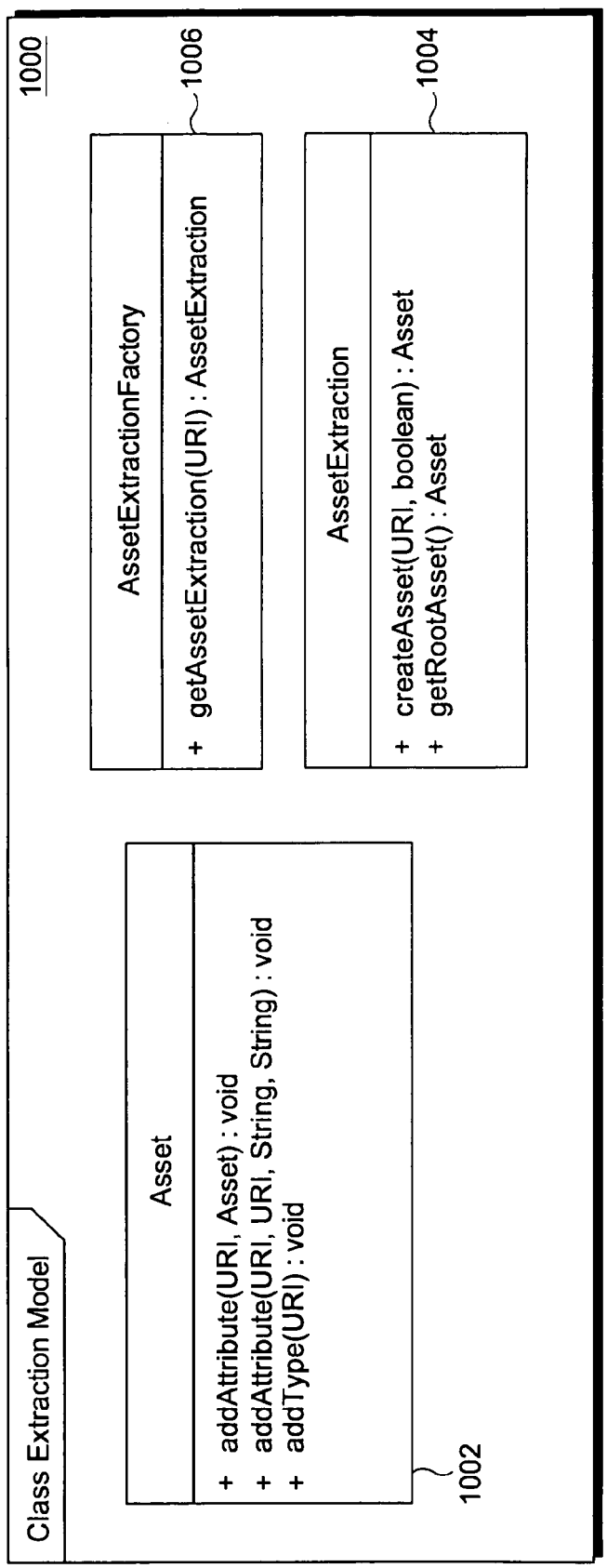
FIG. 10 is an illustrative model Extraction class in accordance with an example embodiment.

FIG. 10 is an illustrative model Extraction class in accordance with an example embodiment. The illustrative model Extraction class 1000 includes an Asset 1002. The Asset 1002 is defined by a unique URI (e.g., the URI is unique for that asset in the store to which it will be published) and information about that particular Asset 1002. This information is about the asset is defined by a set of attributes and types.

A URI is a Universal Resource Indicator, which may be constructed according to an industry standard format or some other format. There are three Asset Methods defined for an Asset 1002:

addType(URI assetTypeURI)—Asserts the membership of the Asset to the specified class.
　assetTypeURI—the URI of a class (defined in a knowledge base or as semantic knowledge).
addAttribute(URI attributeURI, Asset asset)—Adds an attribute to the asset.
　attributeURI—URI of the Property (DataType, Object, Annotation) for the attribute.
　asset—Value of the attribute being added.
addAttribute(URI attributeURI, URI dataTypeURI, String language, String value)—Adds an attribute to the asset.
　attributeURI—URI of the Property (DataType, Object, Annotation) for the attribute.
　dataTypeURI—XML Schema Data Type URI of the value of attribute
　language—language of the value (e.g., "EN" for English)
　value—Lexical (e.g., string) value of the value of the attribute The illustrative model Extraction class 1000 also includes an AssetExtraction 1004 and an AssetExtractionFactory 1006. An AssetExtraction 1004 is a container that holds the extraction of an asset. It includes the asset being extracted and a collection of assets that are part of that asset's extraction.

The method associated with an AssetExtractionFactory 1006 is:

getAssetExtraction(URI assetURI)—Returns an AssetExtraction object to build an extraction of the asset specified by the assetURI.
　assetURI—URI of the asset that the AssetExtraction is for.

The methods associated with an AssetExtraction 1004 are:
createAsset(URI assetURI, Boolean isReferencedAsset)—Returns an asset with the specified URI indicating if the asset is part of the AssetExtraction or an Asset referenced by the AssetExtraction. If the asset already exists an exception is thrown.
　assetURI—unique URI for this asset in the Metadata Library
　isReferencedAsset—Boolean value indicating if the asset is part of the AssetExtraction or a referenced Asset.
getAsset( )—Returns the asset for which the AssetExtraction is for.

When creating an AssetExtraction 1004, assets created for it are either assets that are part of the extraction or assets that are referenced by the extraction. The former are assets that would only exist in the library as part of the root asset's extraction, and the latter are assets that are referenced either directly by the root asset or an asset in the root asset's extraction itself.

2.3.2.2 Example Publisher Component

The Publisher component provides a way to submit an extraction to be published or retracted to or from a store. The Publisher component includes an AssetPublisher class and an AssetPublisherFactory class. The AssetPublisher class publishes and retracts AssetExtractions to and from a store. The AssetPublisherFactory class returns an implementation of an AssetPublisher.

The AssetPublisher is an interface that provides a mechanism to publish and retract AssetExtractions. These methods are defined to be asynchronous calls that return a PublishStatus as a callback mechanism to indicate when it is complete. The AssetPublisherFactory includes the following method:

getAssetPublisher(Map parameters)—returns an implementation of an AssetPublisher.
　parameters—Contains parameters to indicate which AssetPublisher implementation to return as well AssetPublisher implementation specific require parameters.

The AssetPublisher includes the following methods:
publishAssetExtraction(AssetExtraction asssetExtraction)—publishes the AssetExtraction to the store. The AssetExtraction is considered to be the current state of the Asset's extraction that will either be updated by the AssetPublisher implementation, or pushed to the store to be updated (in which case extractors need not worry about the current state of the extraction in the library).
　AssetExtraction—the AssetExtraction that is to be published
retractAssetExtraction(URI assetURI)—retracts the AssetExtraction from a store.
　assetURI—the URI of the asset for which its AssetExtraction should be retracted.

Assets in the AssetExtraction that are not referenced assets may be compared as part of the extraction. Referenced Assets may be handled differently by asset publisher implementations to determine if the asset will be updated (e.g., to keep integrity between client and server, etc.).

3. Example Business Process Management Related Components

Similar techniques to those described above in connection with the EAI environment may also be applied to the Business Process Management (BPM) environment. Thus, this section provides a brief introduction to example logical process definitions and example transforms. It also provides an overview of example processes for extracting encoding data, and capturing and/or managing runtime data, and storing the same as metadata.

3.1 Example Logical Process Definitions 3.1.1 Example BPM Model

This section provides an introduction to logical process definitions in the context of an illustrative new employee setup business process, thus demonstrating how a business analyst can model the flow of a business process.

A business analyst researches the business process to determine the business tasks performed by the different departments, people, and/or functional areas involved in the process. For example, in the new employee illustration, a business analyst might list the tasks that Human Resources (HR) performs or the tasks that the Information Technology (IT) Department performs. The business analyst can use this information to draw (or model) the flow of a business process.

For the new employee setup business process, the hiring manager initiates the business process by filling out an online form that contains information about a new employee to be hired. During the new employee setup business process, other departments use and augment the information that the hiring manager supplies to perform their business tasks.

In this example, Human Resources is responsible for the following business tasks: review and approve the new employee's compensation package and job title; enroll the new employee into the HR system; submit information to the out-sourced payroll administrator to enroll the new employee into the payroll system; and notify the Facilities and IT Departments about the new employee. Facilities is responsible for the following business tasks: assign office space for the new employee; and notify the HR coordinator and hiring manager about the office space for the new employee. The IT Department is responsible for the following business tasks: review the new employee information and assign the new employee a user name and password that will be used for internal systems; enroll the new employee into internal systems (for example, problem tracking, intranet); enroll the new employee into sales management system if the new employee will be in the Sales department; acquire an appropriate computer (laptop or desktop) for the new employee; and notify the HR coordinator and hiring manager after the computer arrives and the new employee is enrolled in appropriate internal systems.

After the business analyst understands the tasks involved in a business process, the process can be modeled. The business analyst can add a process step for each task, show the flow by drawing lines (or transitions) between the steps, and use swimlanes to identify the department (Human Resources, Facilities, IT) that is responsible for performing each step.

Figure 11:
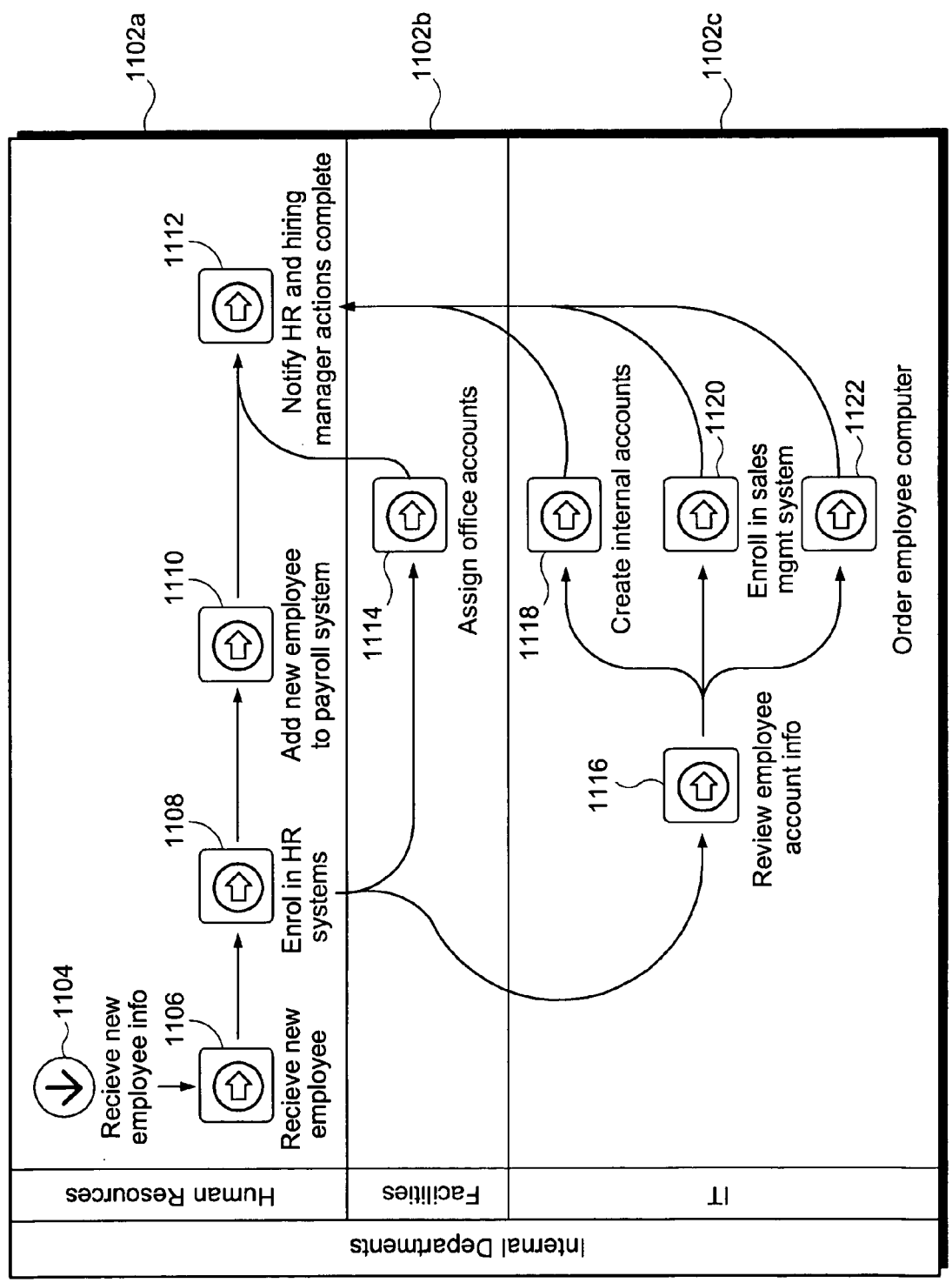
FIG. 11 is a model for the example new employee setup business process.

FIG. 11 is a model for the example new employee setup business process. The three swimlanes 1102*a-c* respective correspond to the internal HR, Facilities, and IT Departments. The process starts by receiving new employee information (1104). The new employee is reviewed (1106). When the new employee is hired, the new employee is enrolled in the HR systems (1108). As will be described in greater detail below, this data is sent to the Facilities and IT Departments as indicated by the arrows crossing into the swimlanes 1102*b-c*. The new employee is added to the payroll system 1110. At this point, HR and the hiring manager are notified that HR's tasks are complete (1112).

As noted above, Facilities receives data from the enrollment in the HR systems (1108). It then assigns office space (1114). When done, HR and the hiring manager are notified that Facilities' tasks are complete (1112). Also as noted above, IT receives data from the enrollment in the HR systems (1108). It then reviews the employee's account information (1116). This information enables IT to create internal accounts (1118), enroll the employee in the sales management system (1120), and order the employee a computer (1122). When done, HR and the hiring manager are notified that IT's tasks are complete (1112).

In addition to modeling the process, a business analyst may also provide documentation about the process as a whole and the individual steps within the process. After modeling the process flow, the business analyst may pass the model to the technical staff, who can review this documentation when adding the logic that is required to make the process executable.

Examples of the type of documentation the business analyst may provide include:

Information about what the step is supposed to accomplish. For the "Add new employee to payroll system" task, the business analyst might provide information about the payroll system, including the information that the payroll system requires;

Input that is needed for a step to be accomplished. For the "Review new employee" step, the business analyst may describe the information that the hiring manager must supply to start the new employee setup business process;

Output that is the result of the step. For the "Review employee account info" step, the business analyst might describe that the IT person must provide an initial password for the user name that will be used for subsequent steps;

Data Transformation Information. For passing data between the steps "Enroll in HR system" and "Add new employee to payroll system," the business analyst describes how the Employee ID in the HR system relates to the employee ID used by the payroll system;

Roles and individuals involved in the process. For the "Review new employee step" the business analyst might list the managers who can approve certain compensation packages;

Complex Business Rules. The business analyst can specify circumstances that require special processing or human review;

Error handling information. For the "Review new employee" step, the business analyst might specify that when the job title or compensation package for the new employee are not appropriate, a message should be sent back to the hiring manager to correct these issues and restart the process;

KPI Information. The key pieces of information that will need to be tracked (such as, wait time for approval) to measure the effectiveness of the automated process and the business/departments involved in the process; and/or Reference documentation. The business analyst can provide HTML hyperlinks to requirements documents or detailed data definitions.

In addition to the documentation being useful to the technical staff who are responsible for implementing the business process to make it executable, process documentation that includes a picture of the process model and the process documentation that the business analyst provides also may be generated.

3.1.2 Example Use Cases for BPM-Related Suggested Transforms

The following is an outline of an illustrative metadata schema of a variety of SOA artifacts, and demonstrates how a variety of metadata-based features may be used in concert to assist a user in discovering and reusing SOA artifacts. In the following scenario, the developer is aware that a Portlet with a map view of the exact specification to satisfy the use case does not exist. For the purposes of this scenario, the following assumptions are made. It is assumed that internal to the company, there is a customer database storing information such as name and addresses, policy number/type/details. This is already mapped to some IS Service under the "Corporate" Package, "Customer" Folder. There are external Web Services that the company has subscribed to for retrieving public home sale records, which will return owners information and the property address. There is a third-party mapping API that could be used for Portlet Development, but it takes points in longitude and latitude to plot any location. A prototype demo map Portlet View with hard-coded inputs exists based on the commercially available mapping product. There is an external Web Service that takes an Address and converts it into GeoCode, which the third-party mapping product can plot. Follow the advice of consultants/professional services for SOA implementation, the company also adopts a SOA artifacts categorization. Services are broadly categorized into two types: Business and Technical. Services that are frequently used directly by high-level business processes, contains business logic, are called Business services. Technical services, in contrast, are typically embedded in the infrastructure that supports these business services.

First, locate the service that wraps the Customer Database. Use the internal database to retrieve customer's address with policy types. Second, find assets of type Portlet that make calls to the located service. See if there are existing example to query the Customer Database. Third, find Web Services Connectors. Use the external web services subscription to retrieve new owners' addresses. Also augment the set of results with GeoCodes. Fourth, find reusable services joining customer data. Join the two set to reveal desirable data. Fifth, build the map from the ingredients. Each of these five example steps is described in greater detail below.

3.1.2.1 Locate the Service that Wraps the Customer Database

Once found, the developer may inspect the service's input, to discover how to use it, and to customize the input such that the service will return customers local to certain selected region.

In a first option, the services could be navigated to from a known location. In a second option, a targeted search may be performed to find any ISJDBCAdapterService that mentions the term "Customer." This option may be used instead of finding any services which mentions the term "Customer," which may include a variety of unwanted results. One way to find the wrapper in this case is to construct a query specifically looking for only those services that are JDBC adapters, narrowing the kinds of results returned.

A third option involves a combination approach. There often already is a Document Type representing customer information in the SOA infrastructure. Therefore, to find the desirable JDBC wrapper, it is possible to first locate the Document Type representing the customer data structure, and then introspect into which IS Services has that document type as outputs.

3.1.2.2 Find Assets of Type Portlet that Make Calls to the Located IS Service This step attempts to find a Portlet, or a View that already connects to the customer database through the located Service. A first option involves a targeted search by name. As an example, if a Service wrapping the customer database found in above is called "CustomerDetails," given the name of the service identified, a search could be conducted to "Find all Portlets that references IS Services of name 'CustomerDetails.'" This essentially specifies the graph pattern:

$x references $y, Portlet($x), ISService($y), $y name 'CustomerDetails' where references is the abstract transitive link. The shortest path from a Portlet to a Service is actually:

Portlet contains View hasDataClient ServiceClient is ServiceReference ISService.

Longer paths may exist in which the Portlet is only indirectly calling the desired service, through other services.

A second option involves a targeted search by reference/dependencies. Given a specific asset, a user may be able to perform targeted search along its reference and dependency chain. For example, users may be able to perform a search for "Find all Portlets that references 'this' specific Services," reducing the reliance on the name. This essentially specifies the graph pattern:

$x references $y, Portlet($x), ISService($y), $y= 'uri:// . . . '

3.1.2.3 Find Web Services Connectors

There are two web services to find: The external public records subscription service, and the GeoCode mapping service. To find existing Web Services Connectors, a first option involves navigation, which may be possible if the web service is known to be "mapped" and that an existing WS Connector exists for it. The user may navigate to the web service. For each web service, any existing WS connectors associated with also may be displayed.

Another option involves a targeted search. Given the WSDL URL location of the web service, the user may construct a search with the following pattern:

$x references $y, ISWSConnector($x), WSDLAsset($y), $y urlLocation 'http:// . . . '

If the services cannot be found, web services are wrapped as WS Connector Services. The connector service may also add additional logic before and after invoking the web service. For example, the public records service may be customizable to return data within a set date range, and within a set geographic location. The output of the service may reuse the customer document type, containing name and addresses at the least. In the case of the GeoCode mapping service, the input to the service in this case may be an array of addresses, and the output could be the same array augmented with GeoCode for each entry. A new document type augmenting the customer data structure may be created.

3.1.2.4 Find Reusable Services Joining Customer Data

This step involves finding the Services that join two sets of customer data together. For a variety of business purposes, it may be logical to assume that there already exist many reusable services (typically Flow services) for manipulating, filtering, and cross-referencing customer information for business intelligence. A technique to find the candidate services in this case is to find those services that outputs customer document type.

Given the Customer Document Type, the user can construct a query with the following pattern:

$x references $y, ISService($x), ISDocType($y), $y name 'CustomerDetails' or $x references $y, ISService($x), ISDocType($y), $y='uri:// . . . '

The previous query may still be somewhat imprecise, as the notion of references is being used rather than specifically for inputs and outputs. Accordingly, users may be able to find services by specific inputs and outputs.

3.1.2.5 Define a "Business Service"

Having identified the components, a useful business level Service can be created bringing together the lower level ingredients. This new service has a specific function, and it is readily consumable by a Portlet View as a data service.

Apart from this specific example, more generally, there are several use cases for suggested transforms in the context of BPM. A first use case relates to when a business analyst thinks that a step might requires a certain input, but the underlying service that implements the step actually requires a different input a transformation is required to manage this type. In such a case, the suggested mapping feature would ask a question along the lines of, "Do you want us to call this 'service' (chain) before invoking the underlying service so that the proper signature (schema) is referenced?"

Figure 12:
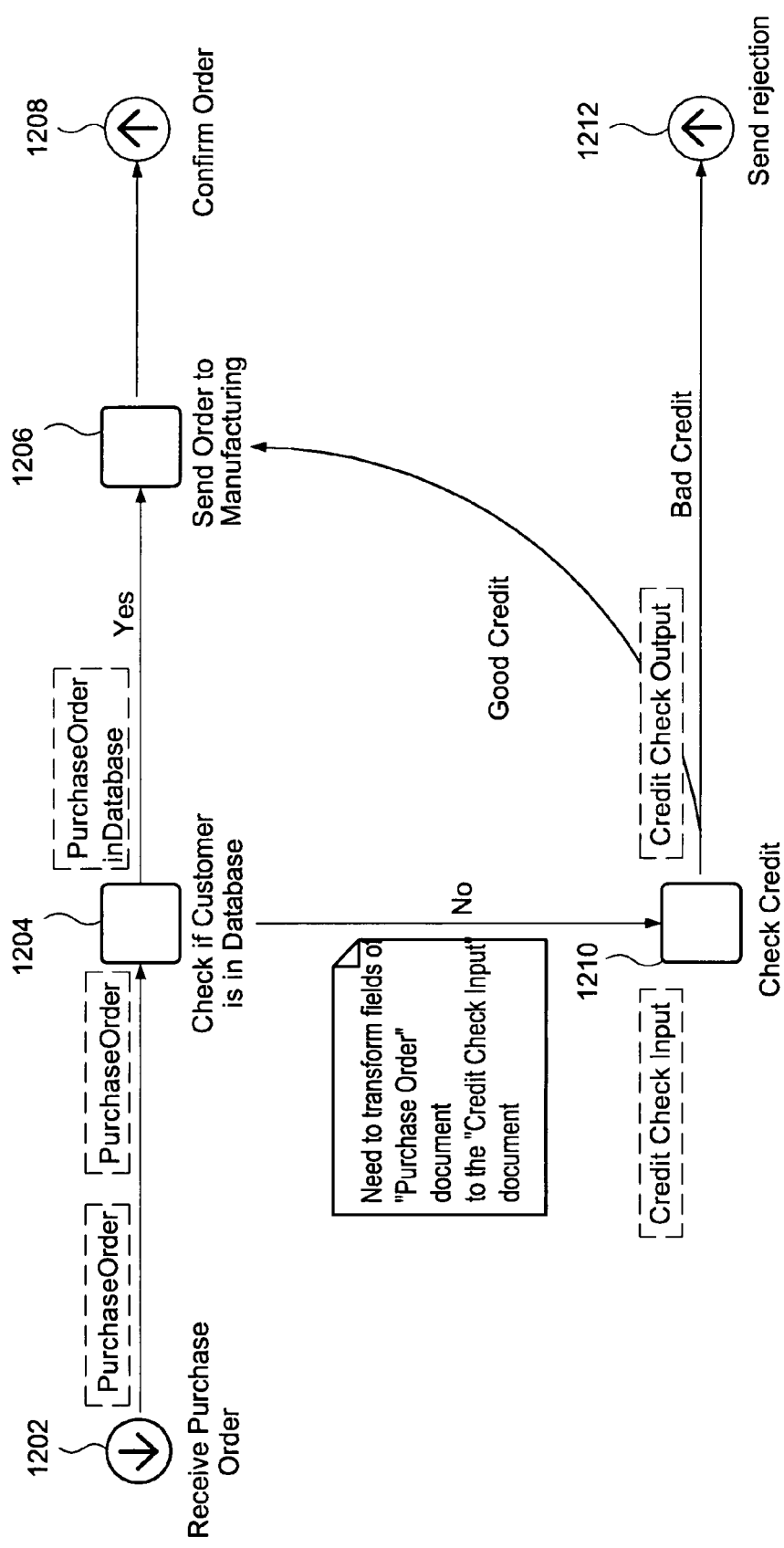
FIG. 12 is an illustrative process model that requires a transformation.

This use case and scenario is reflected in FIG. 12, which is an illustrative process model that requires a transformation. In FIG. 12, a purchase order is received (1202), the purchase order being a "PurchaseOrder" type document. It is next determined whether the customer is in the database (1204). If the customer is in the database, the order is sent to manufacturing (1206), and the order is confirmed (1208). If the customer is not in the database, the customer's credit needs to be checked. Because the credit check application requires a "CreditCheckInput" type document, a transform is needed to transform the fields of the "PurchaseOrder" document to the "CreditCheckInput" document. Once completed, the credit is checked (1210). If the customer has bad credit, a rejection is sent (1212). If the customer has good credit, the order is sent to manufacturing (1206), and the order is confirmed (1208).

A second use case relates to when two separate steps are wired together (e.g., when a credit check process expecting a "CreditApplication" document is triggered by a loan application). In such a case, the suggested transformation feature might initiate a request to find a service (chain) that transforms "MortgageApplication" to "CreditApplication," by deriving the requirements from the input and output signatures of the steps.

Certain example embodiments also might support general searching for transformations based on and input and output type. For example, at the bottom of the illustrative screenshot shown in FIG. 6, an input type 650 and an output type 660 may be specified, thereby yielding one or more pipes 670 that incorporate such respective input and output types.

3.2 Extracting and/or Encoding Data

Encoding data may be extracted, represented, and/or stored in the same or different manners than those set forth above with respect to the EAI environment. The same or similar techniques may be used, as certain example embodiments may share run-time process execution components from the same integration server.

Figure 13:
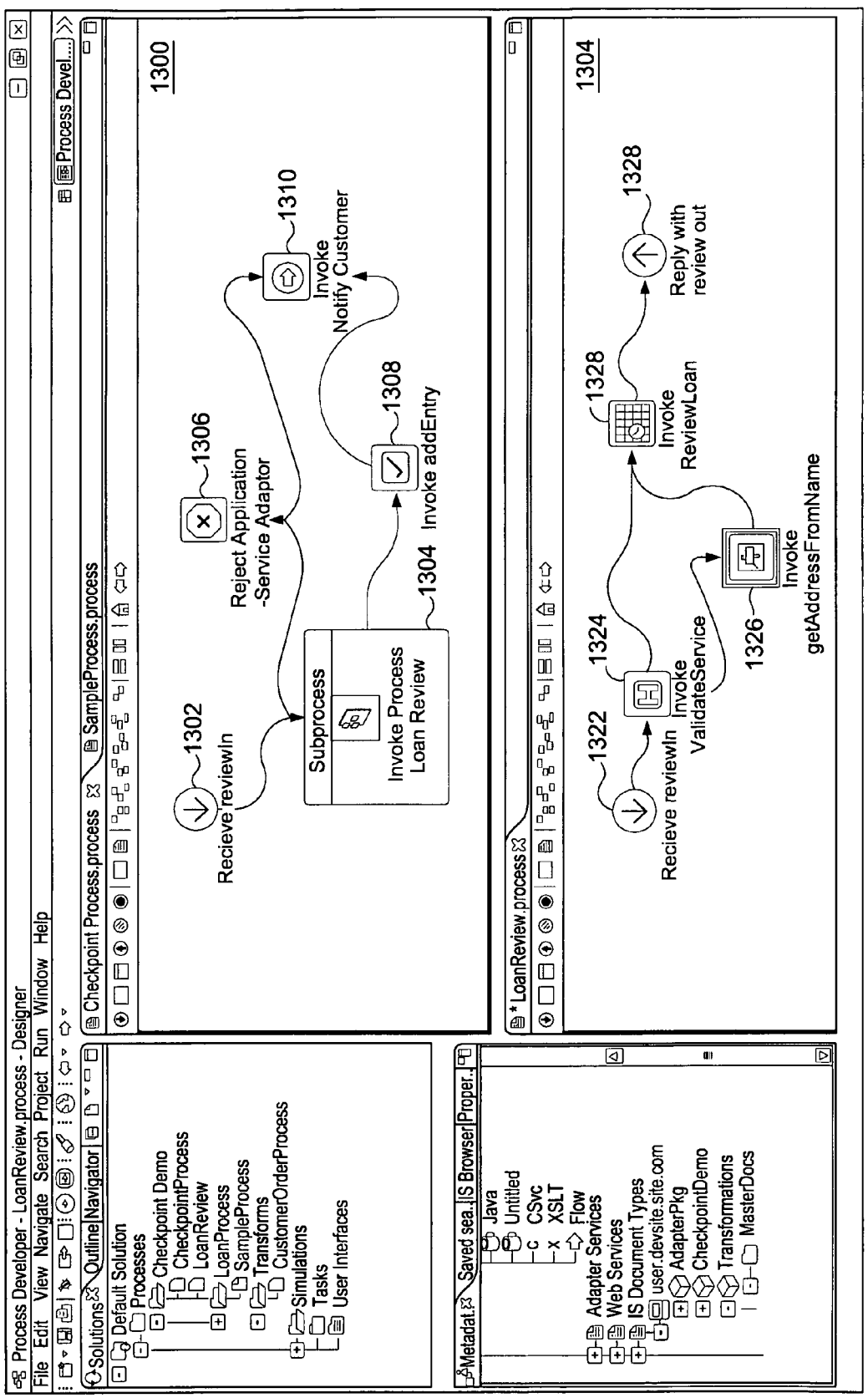
FIG. 13 is an illustrative process definition for a loan application in accordance with an example embodiment.

In any case, FIG. 13 is an illustrative process definition for a loan application in accordance with an example embodiment. In FIG. 13, input data for the loan review is received (1302). This information is passed to the LoanReview subprocess (1304), which is then invoked. Based on the result of the LoanReview subprocess (1304), the application may be rejected by a service adapter (1306) or an entry may be added for a new loan (1308). In either case, the customer is notified via the invoking of a NotifyCustomer module (1310). The bottom pane in corresponds to the LoanReview subprocess (1304). Data is received into the subprocess (1322). A validate service is invoked (1324). The address is retrieved (1326) after the validate service is invoked, and the loan is actually reviewed (1328). After this step, the results are sent back to the parent process (1330).

Figure 14:
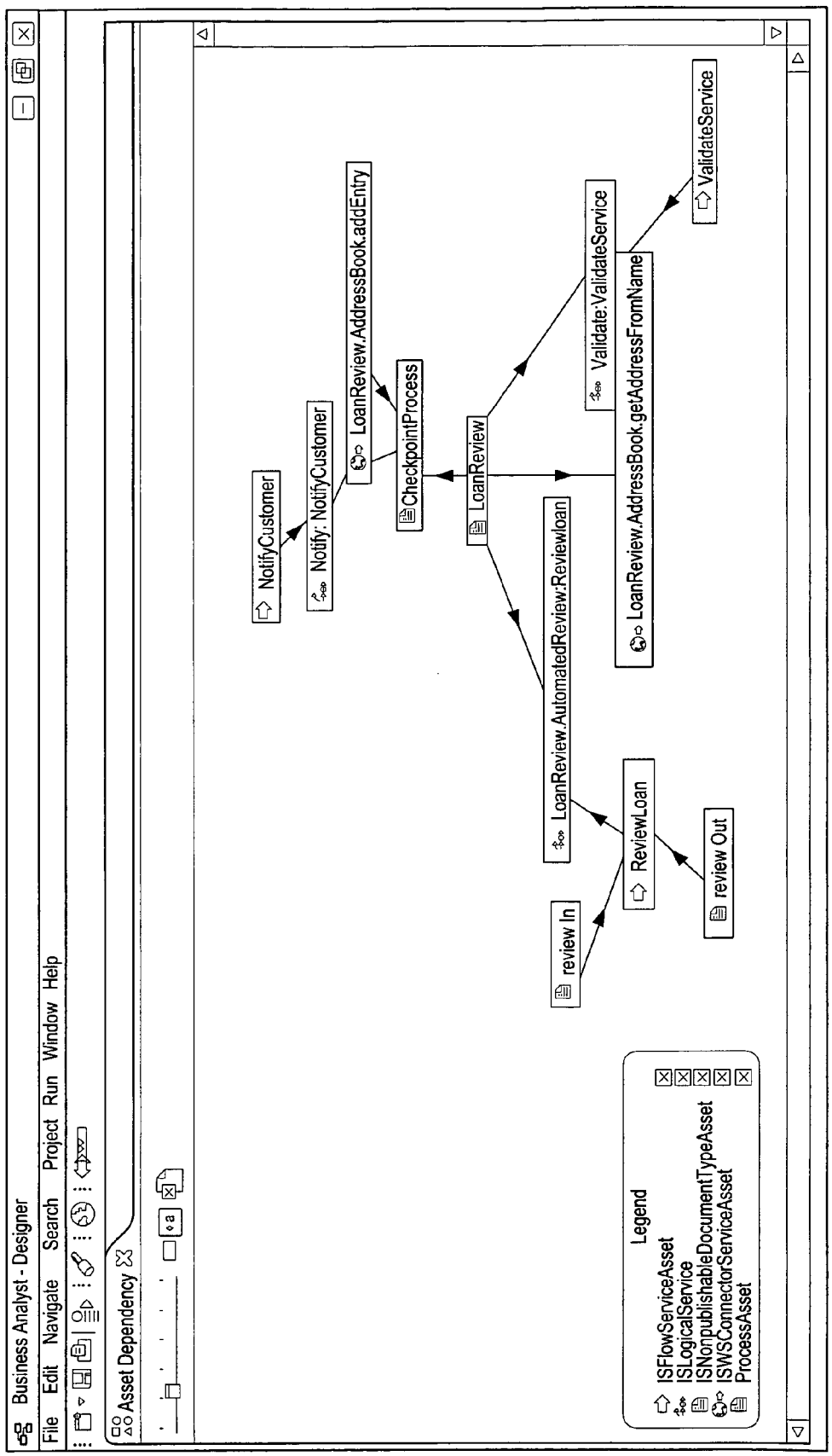
FIG. 14 is an illustrative extraction corresponding to the process defined in FIG. 13, in accordance with an example embodiment.

FIG. 14 is an illustrative extraction corresponding to the process defined in FIG. 13, in accordance with an example embodiment. FIG. 14 shows extracted dependency information for the service assets, logical services, document types, service assets, and process assets of FIG. 13.

3.3 Capturing and/or Managing Runtime Data

Run-time data may be captured, managed, and/or stored in the same or different manners than those set forth above with respect to the EAI environment. For example, deployed Processes and/or transforms (e.g., Flow Services) may be extracted to the store (e.g., Metadata Library), e.g., as described above.

4. Example Suggestive Transforms Techniques 4.1 Introduction

Figure 15:
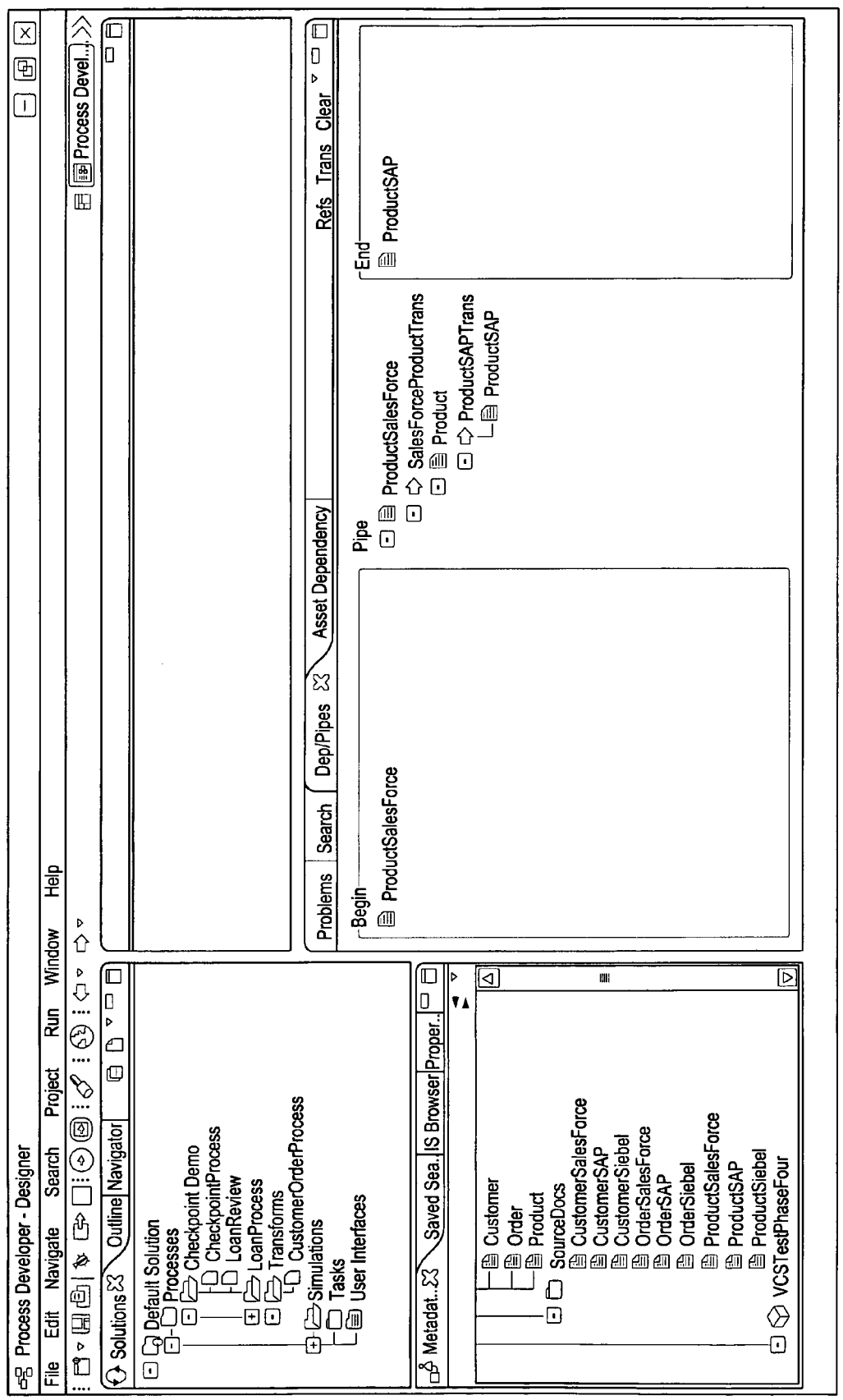
FIG. 15 is an illustrative screenshot showing an example pipeline in accordance with an example embodiment.

Given the above information, certain example embodiments may enable users to search for transformation pipelines and/or may suggest to users a particular pipeline in the context of a mapping scenario. FIG. 15 is an illustrative screenshot showing an example pipeline between "Product Sales Force" metadata input and "Product SAP" (Sales, Application, and Product) metadata output in a "Checkpoint Demonstration" process, in accordance with an example embodiment. The pipeline exists from the Product Sales Force metadata to the Product SAP metadata through a "Sales Force Product Transaction," which includes a "Product" canonical. The "Product" canonical, in turn, is linked to a "Product SAP Transaction," which ultimately is linked to the Product SAP metadata.

It will be appreciated that the general format and usage of the suggestive transforms may depend on asset extraction and storage, as well as the underlying query engine. To this end, the following description is provided as an illustrative method for discovering reusable data transformation services and pipelines.

4.2 Example Definitions

Each service is viewed as a triplet $\{i, s, o,\}$ where i is the input signature, o is the output signature, and s is the service function signature. A store exists, which includes at least a set of service description triplets. The information included in the store represents the set of reusable services within an SOA architecture.

All signatures in their simplest form may be unique identifiers identifying the respective signatures, or they can be more elaborate schemata describing the entities in more detail. With respect to the latter possibility, for example, there may be provided a description of data fields and types in the input and output, and/or the functional role of a service. The level of sophistication may affect the accuracy of the suggestions which, in turn, may depend on the demands of the application.

The process of finding transformation suggestions is considered a query against the store, where the desirable input and output signatures are known as criteria. The results are chains of services of lengths from 1 to n. The suggestions may include the shortest chains matching the criteria.

The general form of the results is:

P input S1 ouput_P1 input S2 output_P2 . . . Sn output Q, where P, Q, S1 . . . Sn, _P1 . . . _Pn are signatures. This is a chain (also sometimes called a pipeline).

The simplest query is of the form:

P input . . . output Q, where P and Q are the desirable signatures.

To answer the query, a "match" function io_match (x, y)→boolean, is defined, which determines whether two signatures are "compatible." The function returns true for compatible signatures, false otherwise. Further details of the match function are provided later.

A query taking the service function signatures into account is of the form:

P input S output Q, where P, Q and S are desirable signatures.

A variant of the match function for service chains, service_match ({s1 . . . sn}, S)→boolean, may be further defined, where by the ordered signatures vector of a chain of services {s1 . . . sn} is matched against the desired service signature S. It returns true if compatible, false otherwise.

4.3 An Example Query-Answering Algorithm

A first step involves identifying candidate chains based on input and output signatures. This can be described as a brute force search process, where the input to this process is {P, Q, store}, and the output is a set {chain}. All chains may have a common form, for example:

x input s1 ouput_p1 input s2 output_p2 . . . sn output y where io_match(x, P)=true, io_match (y, Q)=true, P, Q, are query signatures, and x, sn, _pn are signatures of the actual elements in the result chain.

The spirit of the algorithm is outlined as follows. Identification, matching and retrieval operations are carried out against the metadata library. The service inputs matching condition P are first identified; each unique input separately forms one initial suggestion chain. Each chain is then expanded iteratively, possibly into multiple chains, by finding the services matching the inputs, together with the output signatures of these services: For each original chain, and each unique pair of service and output signatures, the expansion is to replace the original chain with a new chain by copying the content of the original chain, then append to the end a pair of service and output signatures. If the last element of a chain (e.g., an output signature) matches condition Q, then the respective chain is a candidate suggestion. If there is not a match, the chain will enter another iteration of expansion. A chain is discarded if it cannot be expanded further or longer than the threshold, and the output signature does not match Q.

4.3.1 Illustrative Metadata Library Functions

The following illustrative functions may be implemented in certain example embodiments, e.g., to provide interactivity with a metadata library or other suitable storage location.

Function Retrieve: NodeId ->{(label, value)}
   Description: Find node x, and retrieve its data and relationships; this can be described as a function where it maps a specific node identity to a set of (label, value) pairs.

Function Map: NodeId, R->{value}
   Description: Retrieve the values of a node, given a condition R on the data or relationship label. R can be an equality condition on a specific label, or a function matching a range of labels.
   For example, if the triple (procesX, "last modified date", "1/1/08") is in the storage, then Map(processX, "last modified date") would include "1/1/08" in the answer.
   For example, if the triple (procesX, "calls", processY) is in the storage, then Map(processX, "calls") would include processY in the answer.
   It will be appreciated that this can be calculated by an exhaustive test on the results of the Retrieve function, although other more efficient approach also may be adopted in certain example embodiments.

Function Search: P ->{NodeId}
   Description: Find all nodes x, where x satisfy some condition P. P may be a simple condition against node data labels or values, or some combined conditions specified in a boolean formula.
   The condition P may be a match-all condition, hereafter designated with the symbol "*".
   If condition is *, the result contains the identity of all nodes in the storage.
   It will be appreciated that this can be calculated by an exhaustive test on all nodes and their data and relationships in storage, using the above retrieval functions Retrieve and/or Map, although other more efficient approach also may be adopted in certain example embodiments.

Function Connected: P, R, Q ->{(NodeId, NodeId)}
   Description: Find all node pairs of (i, j), where i is directly connected to j, via some relationship r, that all i satisfy some condition P, and j satisfy some condition Q, and r satisfy some condition R.
   This can be calculated by using the above functions Map and Search, albeit a more efficient approach may be adopted in certain example embodiments.
   Definition:
   Let X be the set of nodes Search(P)
   Let Y be the set of nodes Search(Q)
   For each NodeId xx in X,
     Let Z be the set of Map(xx, R) intersects Y.
     For each NodeId zz in Z,
       Add the pair (xx, zz) into the final result.

4.3.2 Illustrative Transformation Suggestion Functions.

To suggest transformation chains for input signature P, and output signature Q, a function Suggest may be outlined as follows.

Function Suggest: P, Q, MAX_LENGTH -> {(x, s1, _p1, s2, _p2, . . . sn, y)}
   All result chains are of length <= MAX_LENGTH
   io_match(x, P) = true and io_match(y, Q) = true.
   Either P, or Q, or both can be the match all condition *.
   Such utility allows partially matched chains to be suggested.

To calculate the answer, the example functions defined in section 4.3.1 may be used against a shared metadata library, where all services signatures are stored among metadata of other assets as graphs of nodes.

The desirable signatures are the conditions entering the query functions Map, Search, and Connected. To deal with the graph of nodes as a graph of input, services, and output, the following example functions may be defined:

FindIO: IOCondition -> {NodeId}
   Definition: FindIO is the function Search. This may utilize io_match(x, IOCondition) to derive the results.

MapFromInput: IOCondition -> {(ServiceId, NodeId)}
   Description: Given an input condition, retrieve all services (i, s, o) where io_match(i, IOCondition) is true. Returns all (s, o) pairs.
   Definition:
   Let X be Connected(IOCondition, label='input', node type='service') // X is a set of (input, service) pairs.
   for each service s in X
     Let Y be Connected(nodeId=s, label='output', *)

```
        // Y is a set of (service, output) pairs
        each element in Y into final results.
    end for
ExpandChains: Previous_Chains, MAX_LENGTH -> Expanded_Chains
    Description: Perform chain expansion. Both Previous_Chains
    and Expanded_Chains has the form: {(p1, s1, p2, s2, p3, ...
    sn-1, pn)}, an array/vector of node identifiers
    The last element of a chain is the output signature of the
    chain, or a symbol indicating the chain cannot be expanded
    any further.
    Definition:
    for each cc in Previous_Chains
        Let Z be MapFromInput(cc[last element]).
        // Each element in Z is an array of size 2.
        if (length of cc >= MAX_LENGTH) or (Z is empty)
            Append a label "TERM" into cc
            Add cc into Expanded_Chains
        else
            for each zz in Z
                if zz is not already part of the chain cc
                    Clone cc into a new exact copy array ee
                    Append zz[0] and zz[1] into ee
                    Add ee to Expanded_Chains
                endif
            endfor
        endif
    end for
RecurseExpand: X, Q, MAX_LENGTH -> Suggestions
    Description: Recursively expand the chains against the
    metadata. Identify answers by matching output against Q.
    Definition:
    let N, Suggestions be empty sets
    let C be ExpandChains(X, MAX_LENGTH)
    for each cc in C
        if cc[last element] == "TERM"
            if (Q is *)
                Add cc into Suggestions,
                    without the last element "TERM"
            endif
        else
            if io_match(cc[last element], Q) == true
                Add cc to Suggestions
            else
                Add cc to N // for further expansion.
            endif
        endif
    endfor
    if (N is non-empty)
        Suggestion = Suggestion Union RecurseExpand(N, Q,
        MAX_LENGTH, Suggestions)
    endif
    return Suggestions
Suggest(P, Q, MAX_LENGTH) -> Suggestions
    Definition:
    Let X be FindIO(P). Let Y be FindIO(Q)
    If either X or Y is empty, return empty set as result. // No
    suggestion.
    Convert each element in X into a vector (or an array) of
    length 1, each array representing an initial chain,
    containing an element from X.
    The resulting set of vectors as X'.
    return RecurseExpand(X', Q, MAX_LENGTH).
```

It will be appreciated that there can be many implementations or embodiment of this algorithm, with different efficiency and accuracy. For example, in terms of termination, shortest path, and cycles, each specific service identity {i, s, o} may appear in multiple chain suggestions but may only appear at maximum once within a single result chain. Additionally, or in the alternative, a predefined threshold setting may set the desired maximum chain length. The algorithm will not attempt to find chains longer than the threshold. A long transformation chain tends to be less useful because of overhead, and might be better optimized by creating a shorter version.

A second step involves filtering by overall service chain function. If the functional signatures of services are not required for accuracy, the result from the first step may be the final result, as the suggestions. Otherwise, the candidate result chains from step 1 may go through a filtering step using the filtering function service_match({s1 ... sn}, S). The final result set contains those chains where service_match returns true.

4.4 Example Signatures and Match Functions

The accuracy of the suggestions depends on the matching functions (io_match, service_match) involved. The least accurate suggestion might still suffice for most applications where the match function is implemented as an equality test on object identities.

There is a spectrum of increasing sophistication, where the input output matching function can be, for example:

Match by identifying structural subsets of signatures. (e.g., a signature of {customer name, address, phone number}, is a more specific structure than the signature {customer name, phone number}).

With field/value space compatibility (e.g., short is a subset of int).

Nested fields.

The same kind of sophistication can be applied to service function matching. The service signature may include:

Service type/class.

Specific function role (e.g., concatenation, type mapping, value mapping, etc).

Function details (e.g., to map a temperature scalar value into discrete categories of hot, mild, cold, etc).

In essence, the matching problem is one of classification. Depending on the levels of sophistication required, several different existing semantic technologies may be used in connection with certain example embodiments. For example, a sophisticated embodiment may employ a Description Logic Engine, where signatures are nested class descriptions and the match function is implemented as subsumption tests of two class descriptions.

4.5 Other Example Suggestive Transform Functionality

As alluded to above, the suggestion process may be seen as a process of matching user-provided input, output, and functional details about a transform to corresponding information already stored in a storage location. Possible outcomes include finding nothing, finding a fragment of a usable transform, finding one and only one match, and/or finding many matches.

The matches may be based on inferences. Such inferences may require an identity of some or all of the input, output, and/or functional characteristics specified. Some inferences may require compatible data structures from which, e.g., compatible and/or identical data may be retrieved. Similarly, some inferences may require compatible functionality. The level of inferences may be user-defined and/or varied based on the EAI or BPM related task at hand.

In a case where many matches are found and/or to more finely tune the suggested transformation process, a wide variety of heuristics may be applied. Such heuristics may be user-defined or not user-defined. In this way, accuracy may be provided and/or rankings may be made based on various criteria. For example, deployment information (such as high availability components, version information, etc.), Business Activity Monitoring (BAM) related data (e.g., throughput, bandwidth, speed of execution, liveliness of process, etc.), policies (e.g., for governance, with respect to rules for who can access what information for what purposes, etc.), and/or the like. Also, suggested transformation may be weighted based on the same and/or similar criteria in certain example embodiments.

The example embodiments described herein may be implemented as any suitable combination of programmed logic circuitry (e.g., hardware, software, firmware, and/or the like). Also, the example embodiments described herein may be tangibly stored as instructions on a computer-readable storage medium.

Although certain example embodiments have been described as relating to EAI, BPM, and the like, it will be appreciated that certain example embodiments may be used in connection with other environments and/or integration scenarios.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for suggesting an enterprise application integration (EAI) transform and/or business process management (BPM) process flow for use in EAI and BPM environments, comprising:
   a storage medium configured to store at least one predefined EAI transform and/or BPM process flow;
   a shared storage location configured to hold extracted data, the extracted data including at least design-time and runtime data extracted from the at least one predefined EAI transform and/or BPM process flow;
   at least one processor configured to:
      create a new EAI transform and/or BPM process flow; and
      determine, based on a search criteria associated with a search strategy, at least one similar predefined EAI transform and/or BPM process flow for use with the new EAI transform and/or BPM process flow, the search strategy including parameters that correspond to at least some of the extracted data, wherein:
   the new EAI transform and/or BPM process flow is created based at least in part on the at least one similar predefined EAI transform and/or BPM process flow, and
   the new EAI transform and/or BPM process flow is executable within both of the EAI and BPM environments.

2. The system of claim 1, wherein the search strategy comprises matching an input, an output, and/or a functionality of the new EAI transform and/or BPM process flow to an input, an output, and/or a functionality of the at least one predefined EAI transform and/or BPM process flow stored in the transform storage location.

3. The system of claim 2, wherein the matching is an exact matching of inputs, outputs, and functionalities.

4. The system of claim 2, wherein the search criteria further includes finding compatible data structures among the new EAI transform and/or BPM process flow and the at least one predefined EAI transform and/or BPM process flow.

5. The system of claim 2, wherein the search criteria further includes finding compatible functionality among the new EAI transform and/or BPM process flow and the at least one predefined EAI transform and/or BPM process flow.

6. The system of claim 1, wherein the at least one processor is further configured to apply a heuristic to rank at least two determined similar predefined EAI transform and/or BPM process flows.

7. The system of claim 1, wherein the at least one processor is further configured to present the at least one similar predefined EAI transform and/or BPM process flow to a user to suggest usage thereof in connection with the new EAI transform and/or BPM process flow.

8. The system of claim 1, wherein the extracted data is metadata.

9. The system of claim 1, wherein:
   the shared storage location includes chains of services, each said chain having an associated length;
   the search strategy includes querying the shared storage location to retrieve the shortest one or more chains of services that have at least one input of a first service thereof and at least one output of a last service thereof match any inputs and outputs, respectively, of the new EAI transform and/or BPM process flow;
   the one or more chains of services retrieved is/are set as the determined similar predefined EAI transform(s) and/or BPM process flow(s); and
   when there are plural determined similar predefined EAI transforms and/or BPM process flows, the at least one processor is further configured to apply a heuristic to rank the plural determined similar predefined EAI transforms and/or BPM process flows based on performance criteria associated therewith.

10. A method of suggesting an enterprise application integration (EAI) transform and/or business process management (BPM) process flow for use in EAI and BPM environments, the method comprising:
   providing at least one predefined EAI transform and/or BPM process flow;
   storing data in a shared storage location, the data including extracted design-time and runtime data that is extracted from the at least one predefined EAI transform and/or BPM process flow during encoding and runtime, respectively;
   determining by a processor, based on a search strategy, a similar predefined EAI transform and/or BPM process flow for use in connection with the new EAI transform and/or BPM process flow, the similar predefined EAI transform and/or BPM process flow being determined from among the at least one predefined EAI transform and/or BPM process flow; and
   creating a new EAI transform and/or BPM process flow based at least in part on the similar predefined EAI transform and/or BPM process flow;
      wherein the new EAI transform and/or BPM process flow is executable within both of the EAI and BPM environments.

11. The method of claim 1, wherein the search strategy further includes matching an input, an output, and/or a functionality of the new EAI transform and/or BPM process flow to an input, an output, and/or a functionality of the at least one predefined EAI transform and/or BPM process flow.

12. The method of claim 11, wherein the matching is an exact matching of inputs, outputs, and functionalities.

13. The method of claim 11, wherein the search strategy further includes finding compatible data structures among the new EAI transform and/or BPM process flow and the at least one predefined EAI transform and/or BPM process flow.

14. The method of claim 11, wherein the search strategy further includes finding compatible functionality among the new EAI transform and/or BPM process flow and the at least one predefined EAI transform and/or BPM process flow.

15. The method of claim 1, further comprising applying a heuristic to rank the similar predefined EAI transforms and/or BPM process flows.

16. The method of claim 15, further comprising ranking at least two of the similar predefined EAI transforms and/or BPM process flows based on deployment information.

17. The method of claim 15, further comprising ranking at least two of the similar predefined EAI transforms and/or BPM process flows based on Business Activity Monitoring (BAM) related data.

18. The method of claim 15, further comprising ranking at least two of the similar predefined EAI transforms and/or BPM process flows based on a predefined policy.

19. The method of claim 1, further comprising ordering at least two of the similar predefined EAI transforms and/or BPM process flows based on user-defined criteria.

20. The method of claim 1, further comprising presenting a suggestion to a user that the similar predefined EAI transform and/or BPM process flow be used in connection with the new EAI transform and/or BPM process flow.

* * * * *